US012663821B2

(12) United States Patent
Jaros et al.

(10) Patent No.: US 12,663,821 B2
(45) Date of Patent: Jun. 23, 2026

(54) SYSTEM AND METHOD FOR DISPENSER MANAGEMENT

(71) Applicant: GOJO Industries, Inc., Akron, OH (US)

(72) Inventors: Carey Jaros, Akron, OH (US); Tamara Cross, Akron, OH (US); Michael Baluch, Akron, OH (US); Mark Bullock, Akron, OH (US); Jason Slater, Akron, OH (US); Jackson Wegelin, Akron, OH (US)

(73) Assignee: GOJO Industries, Inc., Akron, OH (US)

(*) Notice: Subject to any disclaimer, the term of this patent is extended or adjusted under 35 U.S.C. 154(b) by 197 days.

(21) Appl. No.: 18/378,426

(22) Filed: Oct. 10, 2023

(65) Prior Publication Data

US 2024/0118717 A1 Apr. 11, 2024

Related U.S. Application Data

(60) Provisional application No. 63/414,685, filed on Oct. 10, 2022.

(51) Int. Cl.
*G05D 9/12* (2006.01)

(52) U.S. Cl.
CPC ..................................... *G05D 9/12* (2013.01)

(58) Field of Classification Search
CPC . G05D 9/12; H04W 4/80; G01F 13/00; G01F 17/00; G06Q 10/087
See application file for complete search history.

(56) References Cited

U.S. PATENT DOCUMENTS

| | | | | |
|---|---|---|---|---|
| 2009/0204256 A1* | 8/2009 | Wegelin | ................ | B05B 12/082 |
| | | | | 700/244 |
| 2015/0297777 A1* | 10/2015 | Conroy | ................... | B05B 7/262 |
| | | | | 239/74 |
| 2017/0134887 A1 | 5/2017 | Wegelin et al. | | |
| 2019/0063980 A1 | 2/2019 | Kobs | | |
| 2022/0375191 A1* | 11/2022 | Foussat | ................ | G06V 10/454 |

OTHER PUBLICATIONS

International Search Report & Written Opinion corresponding to International Application No. PCT/US2023/034821 dated Jan. 5, 2024, 12 pages.

* cited by examiner

*Primary Examiner* — Laura A Gudorf
(74) *Attorney, Agent, or Firm* — Cooper Legal Group, LLC

(57) ABSTRACT

One or more computing devices, systems, and/or methods are provided. For example, a controller of a dispenser may determine usage data of the dispenser. In association with a replenishment event in which a second refill component mounted to the dispenser is replaced by a first refill component, the controller may (i) determine a next replenishment time of the dispenser based upon the usage data, and/or (ii) transmit an indication of the next replenishment time to a first tag of the first refill component.

20 Claims, 15 Drawing Sheets

700 ⟍

```
┌─────────────────────────────────────────────────┐
│ DETERMINE, BY CONTROLLER OF DISPENSER, USAGE     │  ⟋— 702
│ DATA OF DISPENSER                                │
└─────────────────────────────────────────────────┘
                      ↓
┌─────────────────────────────────────────────────┐
│ IN ASSOCIATION WITH REFILL CHANGEOUT IN WHICH    │
│ SECOND REFILL COMPONENT MOUNTED TO DISPENSER IS  │
│ REPLACED BY FIRST REFILL COMPONENT, (I)          │  ⟋— 704
│ DETERMINE, BY CONTROLLER, NEXT REPLENISHMENT     │
│ TIME OF DISPENSER BASED UPON USAGE DATA, AND     │
│ (II) TRANSMIT, BY CONTROLLER, INDICATION OF NEXT │
│ REPLENISHMENT TIME TO FIRST TAG OF FIRST REFILL  │
│ COMPONENT                                        │
└─────────────────────────────────────────────────┘
```

501

412

410

510

512

416

500

514

516

508

504

400

402

Controller

Main Stadium
West Sing 100-300
001 Sanitizer on stand Outside RRs   — 552

Usage average: 100 dispenses per day  — 554

Est. 3 days remaining  — 556

— 558

Set a Reminder

600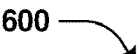

RECEIVE SCAN OF FIRST TAG OF FIRST REFILL COMPONENT, WHEREIN SCAN OF FIRST TAG OF FIRST REFILL COMPONENT IS PERFORMED IN ASSOCIATION WITH REFILL CHANGEOUT IN WHICH SECOND REFILL COMPONENT MOUNTED TO DISPENSER IS REPLACED BY FIRST REFILL COMPONENT, WHEREIN AT LEAST ONE OF FIRST REFILL COMPONENT IS NEW REFILL COMPONENT, OR SECOND REFILL COMPONENT IS USED REFILL COMPONENT — 602

RECEIVE SCAN OF CODE ASSOCIATED WITH DISPENSER — 604

ASSOCIATE REFILL CHANGEOUT WITH DISPENSER BASED UPON SCAN OF FIRST TAG AND SCAN OF CODE — 606

GENERATE USAGE PROFILE ASSOCIATED WITH DISPENSER BASED UPON AT LEAST ONE OF ONE OR MORE REFILL CHANGEOUTS, COMPRISING REFILL CHANGEOUT, ASSOCIATED WITH DISPENSER, OR DATA RECEIVED FROM ONE OR MORE REFILL COMPONENTS COMPRISING SECOND REFILL COMPONENT — 608

DETERMINE NEXT REPLENISHMENT TIME OF DISPENSER BASED UPON USAGE PROFILE — 610

Figure 7:
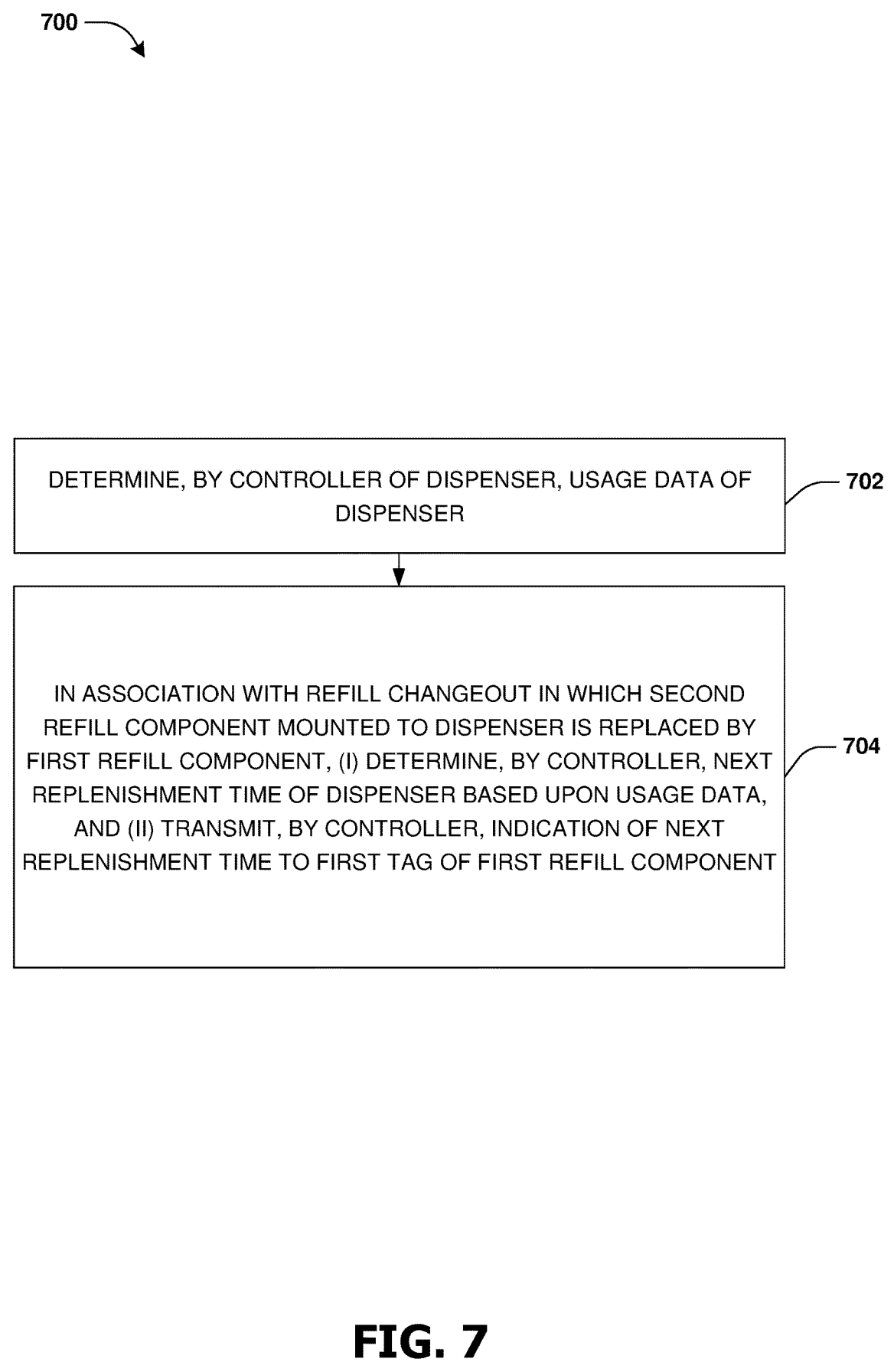

DETERMINE, BY CONTROLLER OF DISPENSER, USAGE DATA OF DISPENSER — 702

IN ASSOCIATION WITH REFILL CHANGEOUT IN WHICH SECOND REFILL COMPONENT MOUNTED TO DISPENSER IS REPLACED BY FIRST REFILL COMPONENT, (I) DETERMINE, BY CONTROLLER, NEXT REPLENISHMENT TIME OF DISPENSER BASED UPON USAGE DATA, AND (II) TRANSMIT, BY CONTROLLER, INDICATION OF NEXT REPLENISHMENT TIME TO FIRST TAG OF FIRST REFILL COMPONENT — 704

Dispenser Management 872
Interface

874

Dispensers in need of
Maintenance

876

Dispensers in need of
Replenishment

878

Scan Overdue

880

Inactive Client

900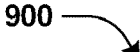

PROVIDE FIRST APPLICATION TO FIRST CLIENT DEVICE, WHEREIN: FIRST APPLICATION CONFIGURES FIRST CLIENT DEVICE TO COLLECT FIRST DISPENSER DATA FROM FIRST DISPENSER WHEN FIRST CLIENT DEVICE IS WITHIN FIRST THRESHOLD DISTANCE OF FIRST DISPENSER, AND FIRST DISPENSER DATA IS INDICATIVE OF AT LEAST ONE OF FIRST STATUS OF FIRST DISPENSER OR FIRST USAGE DATA OF FIRST DISPENSER — 902

RECEIVE FIRST MESSAGE COMPRISING FIRST DISPENSER DATA FROM FIRST CLIENT DEVICE — 904

DETERMINE, BASED UPON FIRST DISPENSER DATA, NEXT REPLENISHMENT TIME OF FIRST DISPENSER — 906

DISPLAY DISPENSER MANAGEMENT INTERFACE ON SECOND CLIENT DEVICE, WHEREIN DISPENSER MANAGEMENT INTERFACE DISPLAYS INDICATION OF NEXT REPLENISHMENT TIME OF FIRST DISPENSER — 908

FIG. 9

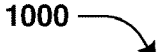

1000

RECEIVE, AT FIRST TIME, FIRST IMAGE OF FIRST REFILL
COMPONENT MOUNTED TO DISPENSER — 1002

DETERMINE FIRST AMOUNT OF PRODUCT IN FIRST REFILL
COMPONENT BASED UPON FIRST IMAGE — 1004

RECEIVE, AT SECOND TIME, SECOND IMAGE OF FIRST REFILL
COMPONENT OR SECOND REFILL COMPONENT MOUNTED TO
DISPENSER — 1006

DETERMINE SECOND AMOUNT OF PRODUCT IN FIRST REFILL
COMPONENT OR SECOND REFILL COMPONENT BASED UPON
SECOND IMAGE — 1008

GENERATE USAGE PROFILE ASSOCIATED WITH DISPENSER BASED
UPON FIRST AMOUNT OF PRODUCT AND SECOND AMOUNT OF
PRODUCT — 1010

DETERMINE NEXT REPLENISHMENT TIME OF DISPENSER BASED
UPON USAGE PROFILE — 1012

DISPENSER
MANAGEMENT
SERVER

1104

1104

1102

1200

1202

1204 NON-TRANSITORY MACHINE READABLE MEDIUM 001001 0100001 010000 0101111 0101111 0000000
00000 0110010 010100 010001 0110011 0000000

1206 READING

1208 DEVICE

1212 PROCESSOR-EXECUTABLE INSTRUCTIONS

1210 READER

1216 PROCESSOR

1214 EMBODIMENT

SYSTEM AND METHOD FOR DISPENSER MANAGEMENT

RELATED APPLICATION

This application claims the benefit of U.S. Provisional Application No. 63/414,685 filed on Oct. 10, 2022, which is incorporated herein by reference in its entirety.

TECHNICAL FIELD

The present disclosure relates to dispensers.

BACKGROUND

Dispensers for liquid products are often installed in public and/or private locations. When actuated, a dispenser may dispense a controlled amount of product onto a user's hand.

SUMMARY

In accordance with the present disclosure, one or more computing devices and/or methods are provided. In an example, a controller of a dispenser may determine usage data of the dispenser. In association with a replenishment event in which a second refill component mounted to the dispenser is replaced by a first refill component, the controller may (i) determine a next replenishment time of the dispenser based upon the usage data, and/or (ii) transmit an indication of the next replenishment time to a first tag of the first refill component.

In an example, a scan of a first tag of a first refill component may be received. The scan of the first tag of the first refill component may be performed in association with a replenishment event in which a second refill component mounted to a dispenser is replaced by the first refill component. The first refill component may be a new refill component and/or the second refill component may be a used refill component. A scan of a code associated with the dispenser may be received. The refill changeout may be associated with the dispenser based upon the scan of the first tag and the scan of the code. A usage profile associated with the dispenser may be generated based upon (i) one or more refill changeouts, comprising the refill changeout, associated with the dispenser and/or (ii) data received from one or more refill components comprising the second refill component. A next refill changeout time of the dispenser may be determined based upon the usage profile.

In an example, a first application may be provided to a first client device. The first application may configure the first client device to collect first dispenser data from a first dispenser when the first client device is within a first threshold distance of the first dispenser. The first dispenser data may be indicative of a first status of the first dispenser and/or first usage data of the first dispenser. A first message comprising the first dispenser data may be received from the first client device. A next refill changeout time of the first dispenser may be determined based upon the first dispenser data. A dispenser management interface may be displayed on a second client device. The dispenser management interface may display an indication of the next refill changeout time of the first dispenser.

In an example, a method is provided. The method includes receiving, at a first time, a first image of a first refill component mounted to a dispenser; determining a first amount of product in the first refill component based upon the first image; receiving, at a second time, a second image of the first refill component or a second refill component mounted to the dispenser; determining a second amount of product in the first refill component or the second refill component based upon the second image; generating a usage profile associated with the dispenser based upon the first amount of product and the second amount of product; and determining a next refill changeout time of the dispenser based upon the usage profile.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5A illustrates aspects of a first replenishment event, in accordance with some embodiments.

FIG. 6 is a flow chart illustrating an example method, in accordance with some embodiments.

FIG. 7 is a flow chart illustrating an example method, in accordance with some embodiments.

FIG. 9 is a flow chart illustrating an example method, in accordance with some embodiments.

FIG. 10 is a flow chart illustrating an example method, in accordance with some embodiments.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

Figure 1:
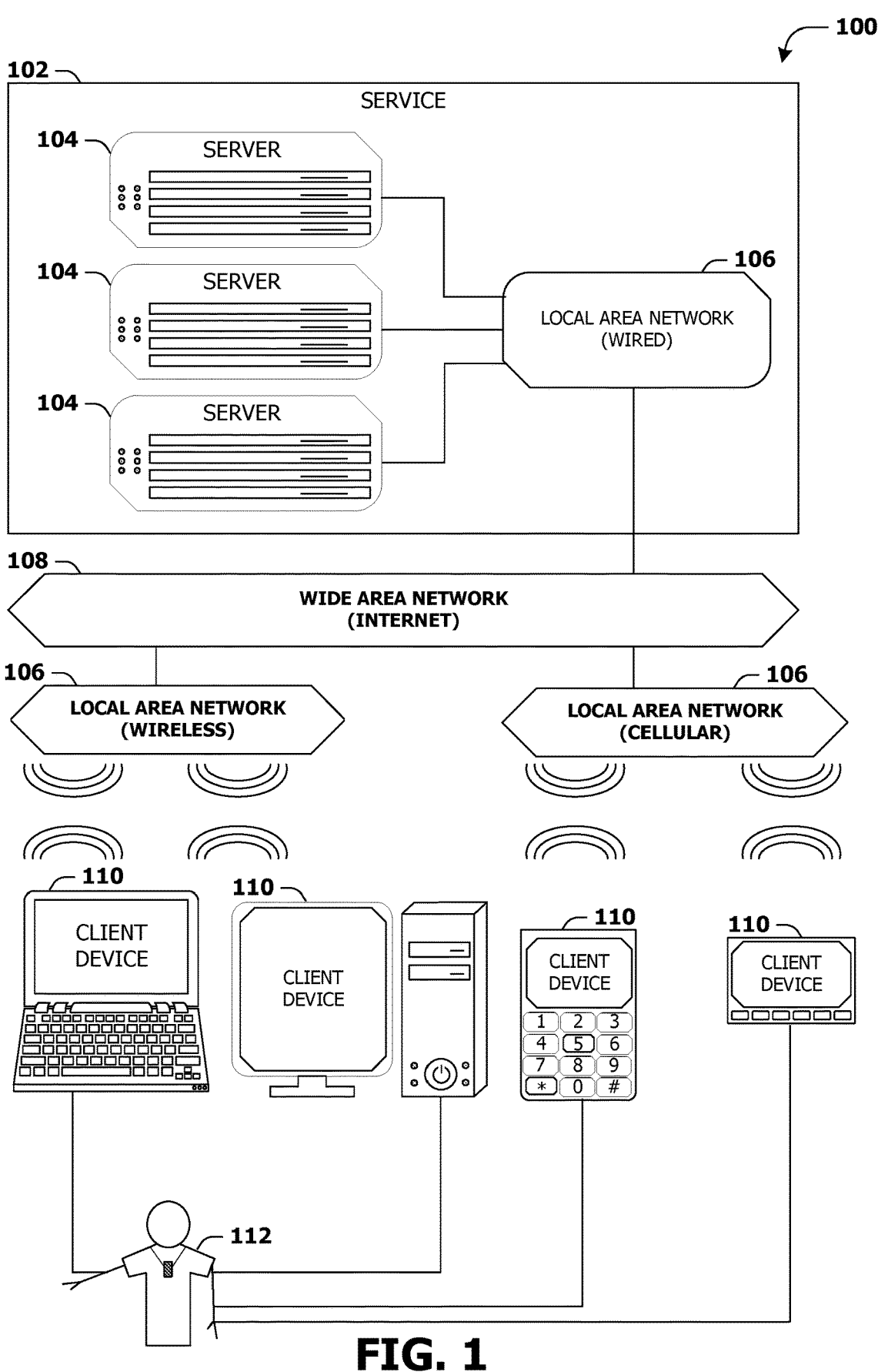
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

In the scenario 100 of FIG. 1, the service 102 may be accessed via a wide area network 108 (WAN) by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108.

One or more client devices 110 may comprise a cellular communicator and may communicate with the service 102 by connecting to the wide area network 108 via a wireless local area network 106 (LAN) provided by a cellular provider.

Alternatively and/or additionally, one or more client devices 110 may communicate with the service 102 by connecting to the wide area network 108 via a wireless local area network 106 provided by a location such as the user's home or workplace. The wireless local area network 106 may, for example, be a WiFi (Institute of Electrical and Electronics Engineers (IEEE) Standard 802.11) network or a Bluetooth (IEEE Standard 802.15.1) personal area network.

It may be appreciated that the servers 104 and the client devices 110 may communicate over various types of networks. Exemplary types of networks that may be accessed by the servers 104 and/or client devices 110 include mass storage, such as network attached storage (NAS), a storage area network (SAN), or other forms of computer or machine readable media.

The servers 104 of the service 102 may be interconnected directly, or through one or more other networking devices, such as routers, switches, and/or repeaters. The servers 104 may utilize a variety of physical networking protocols, such as Ethernet and/or Fiber Channel, and/or logical networking protocols, such as variants of an Internet Protocol (IP), a Transmission Control Protocol (TCP), and/or a User Datagram Protocol (UDP).

The servers 104 of the service 102 may be internally connected via a local area network 106. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

The local area network 106 may be a wired network where network adapters on the respective servers 104 are interconnected via cables (e.g., coaxial and/or fiber optic cabling), and may be connected in various topologies (e.g., buses, token rings, meshes, and/or trees). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

Alternatively and/or additionally, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

Figures 2, 3:
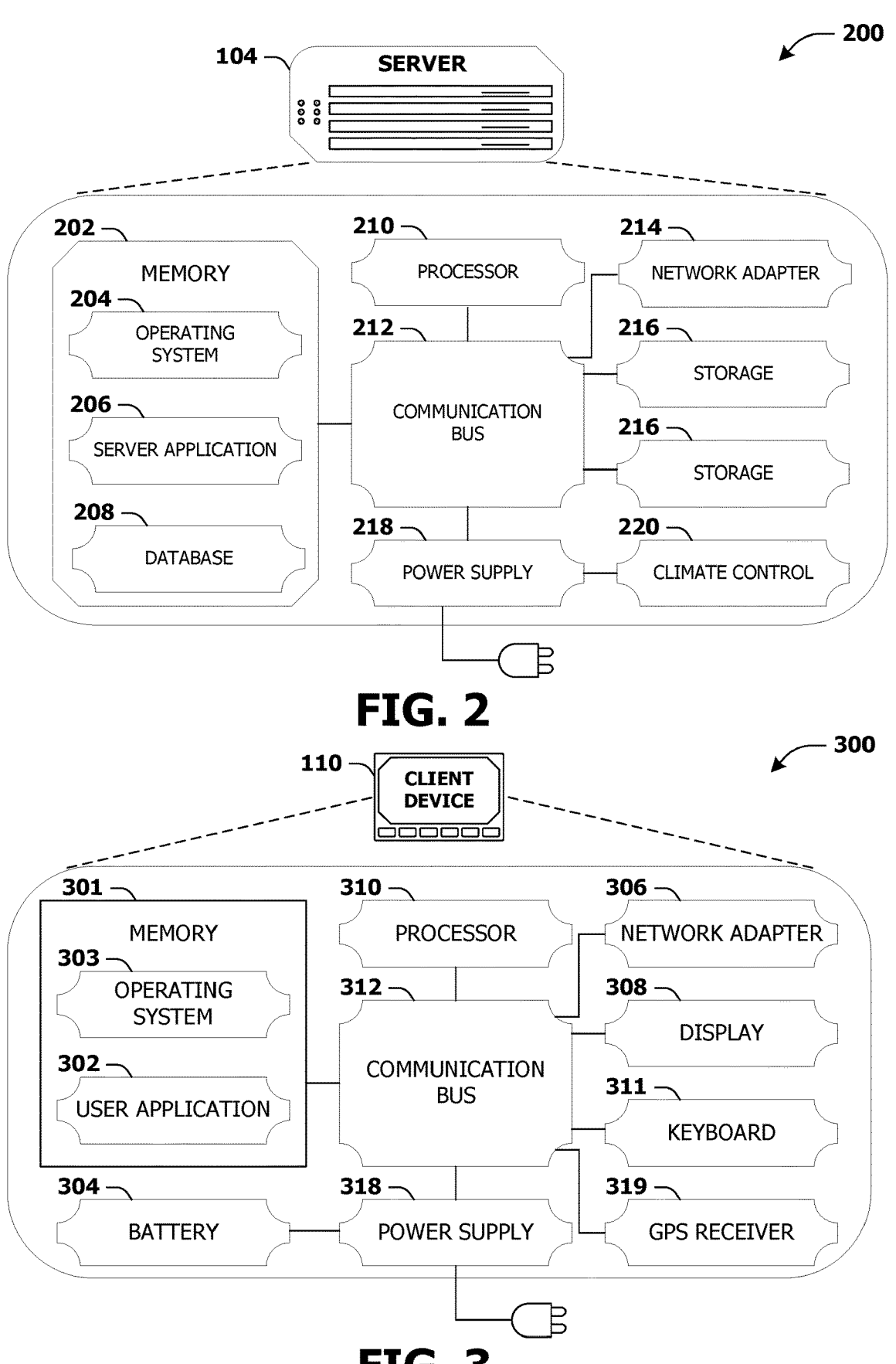
FIG. 2 is an illustration of a scenario involving an example configuration of a server that may utilize and/or implement at least a portion of the techniques presented herein.
FIG. 3 is an illustration of a scenario involving an example configuration of a client that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components.

The server 104 may provide power to and/or receive power from another server and/or other devices. The server 104 may comprise a dedicated and/or shared power supply 218 that supplies and/or regulates power for the other components. The server 104 may comprise a shared and/or dedicated climate control unit 220 that regulates climate properties, such as temperature, humidity, and/or airflow.

The server 104 may include one or more other components that are not shown in the schematic diagram 200 of FIG. 2, such as a display; a display adapter, such as a graphical processing unit (GPU); input peripherals, such as a keyboard and/or mouse; and a flash memory device that may store a basic input/output system (BIOS) routine that facilitates booting the server 104 to a state of readiness. A plurality of such servers 104 may be configured and/or adapted to utilize at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112.

The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals.

In some examples, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified.

In such examples, descriptive content may be stored, typically along with contextual content. For example, the source of an email address (e.g., a communication received from another user via an instant messenger application) may be stored as contextual content associated with the email address. Contextual content, therefore, may identify circumstances surrounding receipt of an email address (e.g., the date or time that the email address was received), and may be associated with descriptive content. Contextual content, may, for example, be used to subsequently search for associated descriptive content. For example, a search for email addresses received from specific individuals, received via an instant messenger application or at a given date or time, may be initiated.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory.

The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol.

The client device 110 may include one or more other components that are not shown in the schematic architecture diagram 300 of FIG. 3, such as one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness. In some examples, the client device 110 may include a climate control unit that regulates climate properties, such as temperature, humidity, and airflow.

The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

The client device 110 may serve the user in a variety of roles, such as a workstation, kiosk, media player, gaming device, and/or appliance. The client device 110 may therefore be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence.

One or more computing devices and/or techniques are provided for managing dispensers. A dispenser may dispense a controlled amount of product (e.g., cleaning product) to a user's hands. It may be important (e.g., for consumer satisfaction) that the dispenser does not go empty. Thus, it may be desired to replenish the dispenser when the refill unit is empty or near-empty. However, especially in facilities with large numbers (e.g., hundreds, thousands, etc.) of dispensers, it may be difficult to keep track of the dispensers to identify which dispensers need replenishing or maintenance. Thus, in accordance with some embodiments, one or more techniques are provided for determining next replenishment times for dispensers and/or managing replenishment events and/or maintenance for the dispensers.

Figures 4A, 4B:
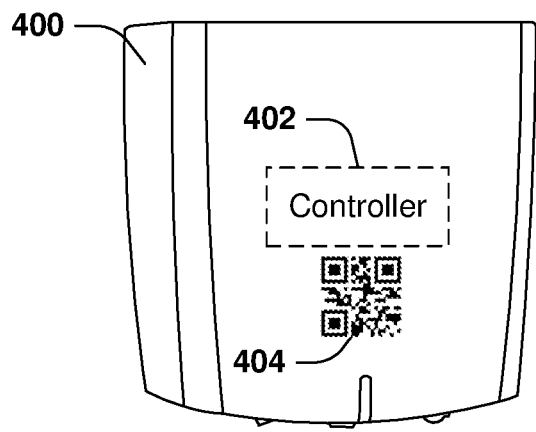
FIG. 4A illustrates a perspective view of a dispenser, in accordance with some embodiments.
FIG. 4B illustrates a perspective view of a refill component, in accordance with some embodiments.

FIG. 4A illustrates a dispenser 400 according to some embodiments. The dispenser 400 may comprise a controller 402. The controller 402 may be housed within a body of the dispenser 400. The dispenser 400 may comprise a code 404 that identifies the dispenser 400. For example, the code 404 may comprise a Quick Response (QR) code. Other examples of the code 404 (e.g., a serial number, a bar code, etc.) are within the scope of the present disclosure.

FIG. 4B illustrates a first refill component 410 according to some embodiments. The first refill component 410 may comprise a first product container 412 configured to store a product. In some examples, the product stored in the first product container 412 of the first refill component 410 may comprise a cleaning product, such as at least one of handwash, soap cleaning gel, cleaning liquid, sanitizing product, sanitizing gel, sanitizing liquid, hand sanitizer, deodorizer, etc. Other examples of the product are within the scope of the present disclosure, such as lotion, other type of liquid product, etc. The first refill component 410 may comprise a first collar 416. The first collar 416 may be configured to connect to the dispenser 400 (shown in FIG. 4A) when the first refill component 410 is mounted to the dispenser 400. In some examples, the first refill component 410 may comprise a first tag 414. The first tag 414 may be coupled to the first collar 416. Embodiments are contemplated in which the first tag 414 is coupled to a different part of the first refill component 410 (other than the first collar 416), such as coupled to the first product container 412.

Figure 4C:
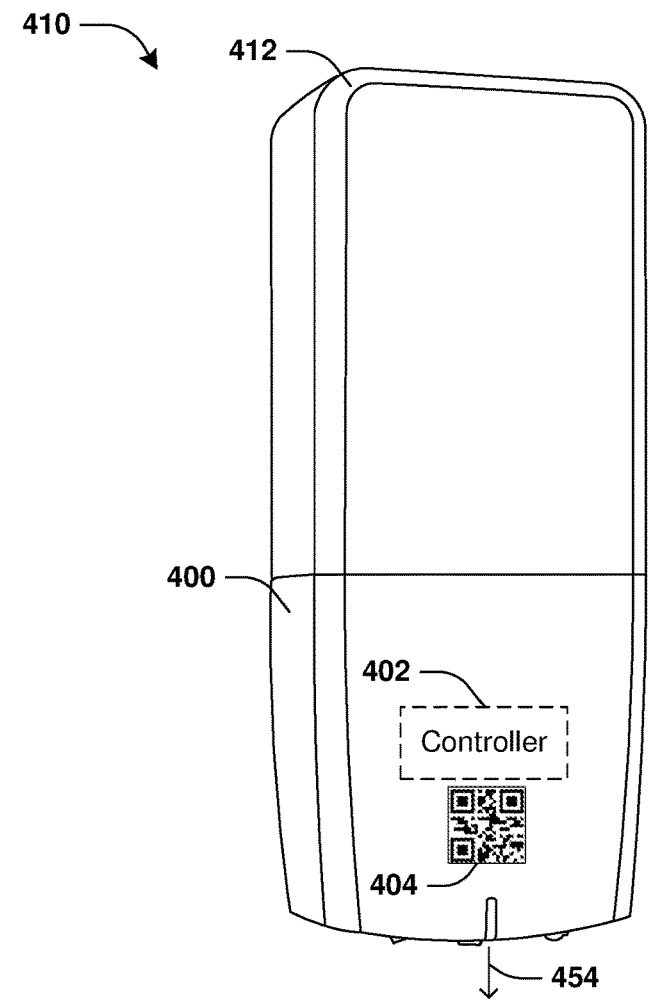
FIG. 4C illustrates a perspective view of a dispenser assembly comprises a dispenser and a refill component mounted to the dispenser, in accordance with some embodiments.

FIG. 4C illustrates a dispenser assembly 450 comprising the first refill component 410 mounted to the dispenser 400, according to some embodiments. In some examples, the dispenser 400 is configured to dispense a portion 454 of the product (e.g., fluid) stored in the first product container 412 through an opening (not shown) in response to an engagement of an individual with the dispenser 400. The portion 545 may comprise a controlled amount of the product. In an example, the controller 402 may be coupled to an actuator (not shown) of the dispenser 400, which may comprise a biometric sensor or proximity sensor that is capable of automatically detecting the presence of an individual's hands. The actuator may comprise a mechanical switch or button that is configured to be manually depressed by an individual. The dispenser 400 may comprise a pump (not shown) that is coupled to the controller 402. The controller 402 may control the pump to dispense the portion 454 of the product from the first product container 412 (that is fluidly coupled to the pump, for example) when the actuator is engaged. For example, in the case where the actuator comprises a proximity sensor, the controller 402 causes the pump to dispense the portion 454 of the product from the first product container 412 when the actuator detects the presence of the individual's hands (and/or when the mechanical switch or button are depressed otherwise engaged). The dispenser 400 may be powered by a power source (not shown), such as a battery, or may be powered by any other suitable power source, such as a solar cell or alternating current (AC) mains power provided by an electrical outlet.

Figure 5A:
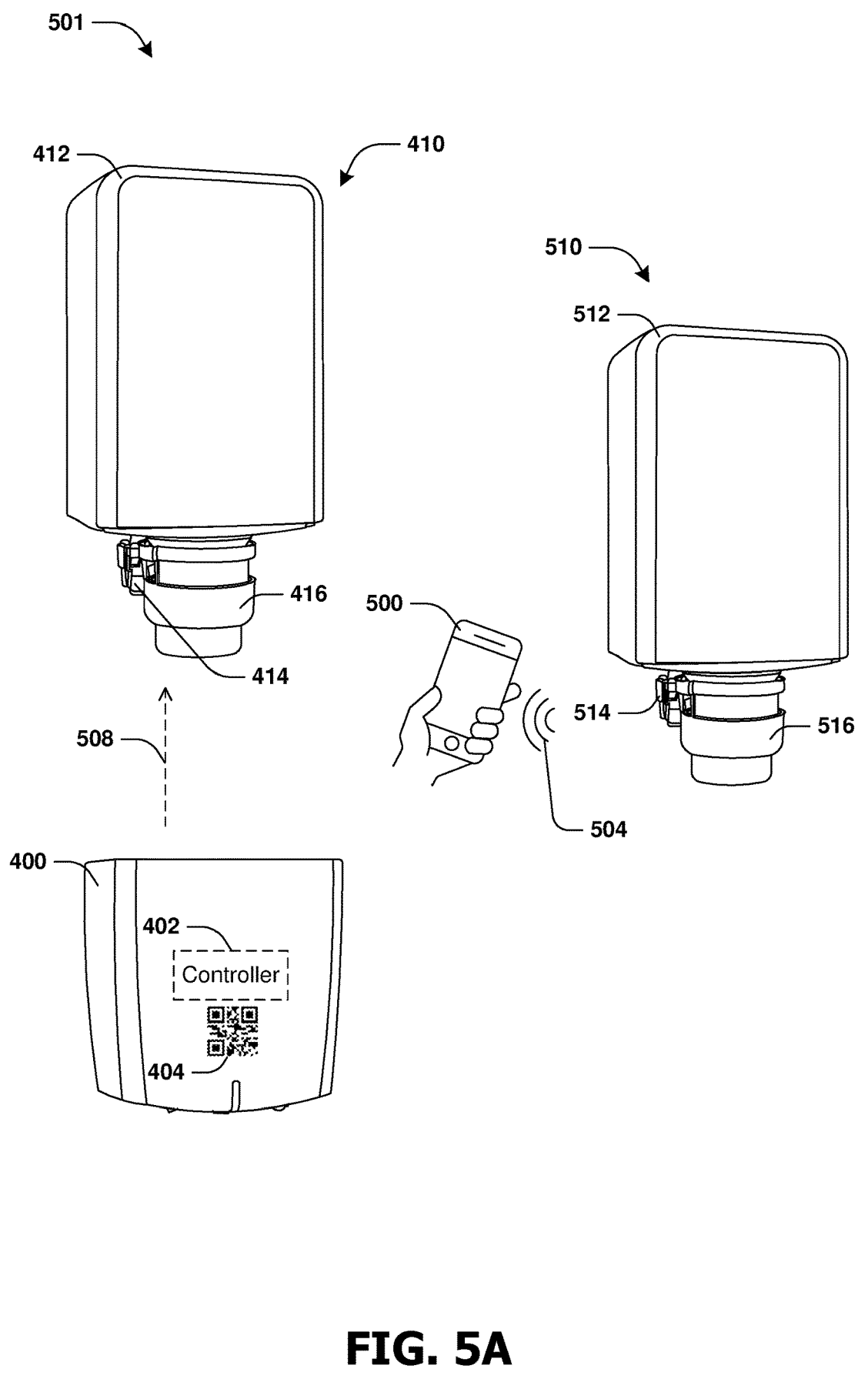
Figure 5B:
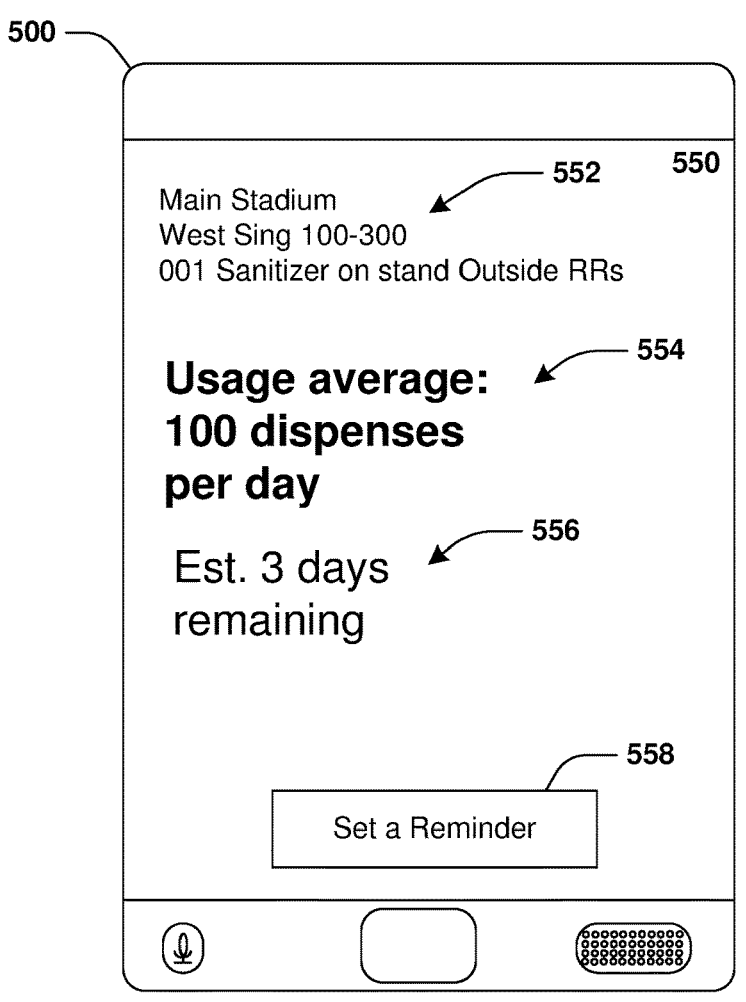
FIG. 5B illustrates a client device displaying a notification indicative of a next replenishment time associated with a dispenser, in accordance with some embodiments.

FIGS. 5A-5B illustrate a system 501 for dispenser management according to some embodiments. FIG. 5A illustrates aspects of a first replenishment event of the dispenser 400 to switch the first refill component 410 (e.g., a used refill component) with a second refill component 510 (e.g., a new refill component). The first replenishment event may be performed when the first refill component 410 is depleted of product (e.g., empty) or is nearing depletion of product (e.g., near-empty) (and/or when an amount of product in the first refill component 410 is less than a threshold amount of product). In some examples, the first replenishment event corresponds to a refill changeout of the dispenser 400. The first replenishment event may include (i) removing 508 the first refill component 410 from the dispenser 400, and/or (ii) mounting (not shown) the second refill component 510 to the dispenser 400. The second refill component 510 may have one, some and/or all of the elements provided herein with respect to the first refill component 410. The first refill component 410 and the second refill component 510 may share the same refill component type (e.g., a model and/or configuration configured for use with the dispenser 400). The second refill component 510 may comprise a second product container 512 configured to store product (e.g., the cleaning product), a second collar 516 and/or a second tag 514 (coupled to the second collar 516 and/or other part of the second refill component 510, for example). Embodiments are contemplated in which the first replenishment event comprises replenishing the first refill component 410 with additional product rather than and/or in addition to replacing the first refill component 410 with the second refill component 510.

In some examples, a first client device 500 (e.g., a phone, a smartphone, a tablet, a wearable device, a laptop, a computer, etc.) may be used to scan the first tag 414 of the first refill component 410 and/or the second tag 514 of the second refill component 510 (during the first replenishment event, for example). In an example, the first tag 414 and/or the second tag 514 may comprise a Near-Field Communication (NFC) device (e.g., an NFC tag) configured to communicate (e.g., wirelessly communicate) with NFC-enabled devices (e.g., the first client device 500). Embodiments in which the first tag 414 and/or the second tag 514 use other types of communication devices (e.g., Radio Frequency Identification (RFID) among others) other than NFC.

A tag (e.g., the first tag 414, the second tag 514 and/or other tags of other refill components) may be scanned using the first client device 500 by (i) reading data from the tag (e.g., via NFC) using an NFC tag reading device of the first client device 500, (ii) tapping the first client device 500 onto the tag, and/or (iii) positioning the first client device 500 within a threshold distance of the tag. The data read from the tag may have been written to and/or stored on memory of the tag (e.g., the tag may retrieve the data from the memory to provide the data to the first client device 500). The data read from the tag via the scan of the tag may include (i) a refill identifier identifying a refill component (e.g., the first refill component 410 and/or the second refill component 510) comprising the tag, (ii) an amount of product in the refill component, (iii) dispenser data associated with the dispenser 400, (iv) a date of expiration of the refill component, (v) a duration of time since empty (e.g., a quantity of days since the refill component became depleted), and/or (vi) other suitable data. At least some of the data stored on the memory may be used for predicting a next replenishment time of the dispenser 400. In some examples, the tag may receive the dispenser data from the controller 402 of the dispenser 400 (e.g., the controller 402 and/or the tag may write the dispenser data to the memory of the tag). For example, the controller 402 may determine at least some of the dispenser data. For example, the controller 402 may comprise a communication device (e.g., an NFC communication device) configured to communicate with the tag (while the tag is within a threshold distance of the controller 402, for example). The controller 402 may transmit the dispenser data to the tag using the communication device.

In some examples, the first client device 500 may be associated with (e.g., may belong to and/or be in the possession of) a dispenser agent (e.g., a technician, a custodian, etc.). The dispenser agent may be tasked with performing the first replenishment event. The dispenser agent may be tasked with scanning the first tag 414 and/or the second tag 514 (during the first replenishment event, for example). For example, the first client device 500 may scan the first tag 414 to collect first data (e.g., at least one of a first refill identifier of the first refill component 410, an amount of product in the first refill component 410, first dispenser data associated with the dispenser 400, etc.) from the first tag 414 (during the first replenishment event, for example). Alternatively and/or additionally, the first client device 500 may scan the second tag 514 to collect second data (e.g., at least one of a second refill identifier of the second refill component 510, an amount of product in the second refill component 510, second dispenser data associated with the dispenser 400, etc.) from the second tag 514 (during the first replenishment event, for example). For example, the second data may be received by the first client device 500 from the second tag 514 via a transmission 504 (shown in FIG. 5A), such as when the first client device 500 is within a threshold distance of the second tag 514.

Dispenser data (e.g., the first dispenser data and/or the second dispenser data) collected by the first client device 500 may be indicative of (i) a dispenser identifier of the dispenser 400 and/or (ii) usage data of the dispenser 400. The usage data may be indicative of (i) a rate at which replenishment events are performed for the dispenser 400, (ii) a rate at which dispense events (e.g., an event in which the dispenser 400 dispenses a portion 454 of the product) are performed using the dispenser 400, (iii) a dispense event count of the dispenser 400 (e.g., the controller 402 may track dispense events performed using the dispenser 400), (iv) times at which replenishment events were performed for the dispenser 400, (v) times at which dispense events were performed using the dispenser 400, (vi) a peak usage rate of the dispenser 400 (e.g., a peak rate at which replenishment events and/or dispense events are performed with the dispenser 400), (vii) an average usage rate of the dispenser 400 (e.g., an average rate at which replenishment events and/or dispensers are performed with the dispenser 400), (viii) one or more daily dispense volume totals (e.g., 14 daily dispense volume totals), wherein each of the one or more daily dispense volume totals may be indicative of a total volume of product that has been dispensed over a day, (ix) a rolling volume total (e.g., a 14 day rolling volume total) which may be indicative of a total volume of product that has been dispensed on a rolling basis, (x) a duration of time since empty (e.g., a quantity of days since a refill component mounted to the dispenser 400 became depleted) and/or (xi) other data associated with the dispenser 400.

In some examples, data (e.g., the first data from the first tag 414 and/or the second data from the second tag 514) collected by the first client device 500 may be transmitted to a dispenser management system. In some examples, the dispenser management system may provide a first application (e.g., a mobile application, a web application, etc.) to the first client device 500. The first application may be installed on the first client device 500. The first application may be used to communicate with the dispenser management system (e.g., the first client device 500 may transmit data to and/or receive data from the dispenser management system using the first application). Alternatively and/or additionally, the first application may be used for performing one or more functions associated with scanning the first tag 414 and/or the second tag 514. For example, the first application may display a guidance interface with graphical objects and/or text that guide the dispenser agent to position the first client device 500 relative to a tag (e.g., the first tag 414 and/or the second tag 514) and/or to engage with an interface feature (e.g., a button, a selectable input, etc.) that triggers the first client device 500 (and/or the first application) to perform the scan of the tag.

In some examples, the code 404 associated with the dispenser 400 may be scanned (during the first replenishment event, for example) using the first client device 500. For example, the dispenser agent may be tasked with scanning the code 404 (during the first replenishment event, for example). In some examples, the code may be indicative of a dispenser identifier of the dispenser 400. In some examples, scanning the code 404 may comprise capturing an image comprising a depiction of the code 404 (using a camera of the first client device 500, for example), and/or analyzing the image (using image processing techniques, for example) to determine the code 404. For example, the first client device 500 may scan the first code 404 to determine the dispenser identifier of the dispenser 400. The first client device 500 and/or the dispenser management system may determine that the first data, the second data, and/or the first replenishment event are associated with the dispenser 400 based upon the scan of the code 404 indicative of the dispenser identifier. For example, the first client device 500 and/or the dispenser management system may associate the dispenser 400 with the first replenishment event based upon the scan of the code 404 (and/or the scan of the first tag 414 and/or the second tag 514). Alternatively and/or additionally, the first client device 500 and/or the dispenser management system may associate the dispenser 400 with the first data based upon the scan of the code 404 and/or the scan of the first tag 414. Alternatively and/or additionally, the first client device 500 and/or the dispenser management system may associate the dispenser 400 with the second data based upon the scan of the code 404 and/or the scan of the second tag 514.

In some examples, a first usage profile associated with the dispenser 400 may be generated (and/or updated) based upon the first data and/or the second data associated with the first replenishment event. For example, the first usage profile may be generated by the dispenser management system, the first client device 500 and/or the controller 402. The first usage profile may be updated based upon further sets of data collected from tags (e.g., the first tag 414 and/or the second tag 514) of refill components (e.g., the first refill component 410 and/or the second refill component 510) mounted to the dispenser 400. In some examples, at least some of the further sets of data are received in association with replenishment events of the dispenser 400, such as using one or more of the techniques provided herein with respect to collecting the first data and/or the second data in association with the first replenishment event. In some examples, the further sets of data may be received from the first client device 500 and/or other client devices (e.g., client devices which may be associated with dispenser agents and/or may be provided with and/or may run the first application).

In some examples, the first usage profile may be indicative of (i) a rate at which replenishment events are performed for the dispenser 400, (ii) a rate at which dispense events are performed using the dispenser 400, (iii) a dispense event count of the dispenser 400, (iv) times at which replenishment events were performed for the dispenser 400, (v) times at which dispense events were performed using the dispenser 400, (vi) a peak usage rate of the dispenser 400 (e.g., a peak rate at which replenishment events and/or dispense events are performed with the dispenser 400), (vii) an average usage rate of the dispenser 400 (e.g., an average rate at which replenishment events and/or dispensers are performed with the dispenser 400), and/or (viii) other data associated with the dispenser 400. Alternatively and/or additionally, the first usage profile may be indicative of one or more usage patterns of the dispenser 400. For example, the one or more usage patterns may indicate that the dispenser 400 is used more on a first day of the week (e.g., Monday) than on a second day of the week (e.g., Saturday).

In some examples, the first usage profile is generated using a first machine learning model. In some examples, the first machine learning model may comprise at least one of a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model, a random forest model, a machine learning model used to perform dimensional reduction, a machine learning model used to perform gradient boosting, a neural network model (e.g., a deep neural network model and/or a convolutional neural network model), etc. The first machine learning model may be trained to identify the one or more usage patterns of the dispenser 400 based upon the first data, the second data and/or the further sets of data.

In some examples, the first usage profile may be used to determine (e.g., predict) a next replenishment time of the dispenser 400. For example, the next replenishment time may correspond to a remaining amount of time until a current refill component mounted to the dispenser 400 will be depleted of product (e.g., cleaning product) or be nearing depletion of product (and/or an amount of product in the current refill component is less than a threshold amount of product). Alternatively and/or additionally, the next replenishment time may correspond to a remaining amount of time until the current refill component mounted to the dispenser 400 is recommended to be switched with another refill component. In an example, the next replenishment time is determined by (i) determining an amount of product in the current refill component mounted to the dispenser 400 (e.g., the amount of product may be collected from a tag of the current refill component during a replenishment event in which the current refill component was mounted to the dispenser 400 and/or the current refill component may be assumed to be full when the current refill component is initially mounted to the dispenser 400), (ii) determining (e.g., predicting), based upon the first usage profile, a product consumption rate at which product from the current refill component is dispensed by the dispenser 400, and/or (iii) determining the next replenishment time based upon the amount of product and the product consumption rate. Alternatively and/or additionally, the next replenishment time may be determined based upon the one or more usage patterns (e.g., days predicted to have relatively greater or lesser dispenser usage may be considered in determining the product consumption rate).

An embodiment of determining a next replenishment time of the dispenser 400 is illustrated by an example method 600 of FIG. 6, and is further described in conjunction with FIGS. 4A-5B. At 602, a scan of the second tag 514 of the second refill component 510 may be received (by the first client device 500 and/or the dispenser management system, for example) in association with the first replenishment event in which the first refill component 410 mounted to the dispenser 400 is replaced by the second refill component 510. For example, the scan of the second tag 514 may comprise the second data collected by the first client device 500 from the second tag 514. In some examples, the first refill component 410 is a used refill component and/or the second refill component 510 is a new refill component.

In some examples, the first client device 500 may scan the second tag 514 to collect the second data during the first replenishment event. For example, the first client device 500 may scan the second tag 514 (and/or collect the second data from the second tag 514) prior to mounting the second refill component 510 to the dispenser 400. Alternatively and/or additionally, the first client device 500 may scan the second tag 514 (and/or collect the second data from the second tag 514) after mounting the second refill component 510 to the dispenser 400 (and/or while the second refill component 510 is mounted to the dispenser 400). In some examples, the second tag 514 communicates (wirelessly, for example) with the controller 402 to retrieve the second dispenser data from the controller 402 prior to being scanned by the first client device 500. For example, the second tag 514 may receive the second dispenser data from the controller 402 in response to the second tag 514 moving to a location within a threshold distance of the controller 402. The second tag 514 may include the second dispenser data in the transmission 504 to the first client device 500 (when the first client device 500 scans the second tag 514, for example).

At 604, a scan of the code 404 associated with the dispenser 400 may be received (by the first client device 500 and/or the dispenser management system, for example). For example, the scan of the code 404 may comprise the image comprising the depiction of the code 404. For example, the code 404 associated with the dispenser 400 may be scanned (during the first replenishment event, for example) using the first client device 500 (e.g., using the camera of the first client device 500).

At 606, the client device 500 and/or the dispenser management system may associate the first replenishment event with the dispenser 400 based upon the scan of the code 404 (and/or the scan of the second tag 514). In some examples, a time of the first replenishment event of the dispenser 400 may be determined based upon a time at which the code 404 and/or the second tag 514 are scanned using the first client device 500.

At 608, the first usage profile associated with the dispenser 400 may be generated (by the first client device 500 and/or the dispenser management system, for example) based upon (i) a set of (one or more) replenishment events, comprising the first replenishment event, associated with the dispenser 400 and/or (ii) data received from one or more refill components (e.g., received from tags of the one or more refill components). The data may include sets of data received from tags of prior refill components, such as the first refill component 410, that were mounted to the dispenser 400 prior to the first replenishment event. For example, the sets of data may be received in association with prior replenishment events (involving the prior refill components) that were performed prior to the first replenishment event. The set of replenishment events may comprise the prior replenishment events. In an example, the set of replenishment events of the dispenser 400, and/or times of the set of replenishment events of the dispenser 400 may be determined using one or more of the techniques provided herein with respect to determining the first replenishment event of the dispenser 400 and/or the time of the first replenishment event. The first client device 500 and/or the dispenser management system may use the times of the set of replenishment events (and/or may monitor for further scans indicating further replenishment events of the dispenser 400) to determine (and/or update) a product consumption rate associated with the dispenser 400, which may be indicated by the first usage profile and/or may be used to determine the next replenishment time.

At 610, the next replenishment time of the dispenser 400 may be determined (by the first client device 500 and/or the dispenser management system, for example) based upon the first usage profile. In an example, the next replenishment time may correspond to a remaining amount of time until the second refill component 410 mounted to the dispenser 400 will be depleted of product (e.g., cleaning product) or be nearing depletion of product (and/or an amount of product in the second refill component 410 is less than a threshold amount of product). Alternatively and/or additionally, the next replenishment time may correspond to a remaining amount of time until the second refill component 410 mounted to the dispenser 400 is recommended to be switched with another refill component. In an example, the next replenishment time is determined by (i) determining an amount of product in the second refill component 410 mounted to the dispenser 400 (e.g., an indication of the amount of product may be collected via the scan of the second tag 514 during the first replenishment event and/or the second refill component 410 may be assumed to be full when the second refill component 410 is initially mounted to the dispenser 400), (ii) determining (e.g., predicting), based upon the first usage profile, a product consumption rate at which product from the second refill component 410 is (predicted to be) dispensed by the dispenser 400, and/or (iii) determining the next replenishment time based upon the amount of product and the product consumption rate.

In some examples, a notification of the next replenishment time may be displayed on the first client device 500 and/or a second client device different than the first client device 500 (e.g., the second client device may be associated with a different dispenser agent than the first client device 500). In some examples, the notification of the next replenishment time may be displayed in response to determining the next replenishment time. In some examples, the first client device 500 displays the notification using the first application. The notification may be displayed during and/or shortly after the first replenishment event is performed (to notify the dispenser agent associated with the first client device 500 of how long product in the second refill component 410 is predicted to last, for example). FIG. 5B illustrates the first client device 500 displaying the notification (shown with reference number 550). The notification 550 may comprise dispenser identification information 552 indicative of a facility location of the dispenser 400 (and/or the dispenser identifier of the dispenser 400). The facility location may identify a location of the dispenser 400 relative to a facility (e.g., a building, a station, a campus, a stadium, an arena, etc.) in which the dispenser 400 is disposed. For example, the facility location may indicate at least one of a room number of a room in the facility, a building name of a building of the facility, a floor of a building in the facility, etc. where the dispenser 400 is positioned. This may allow a consumer of the notification 550 to quickly identify where the dispenser 400 is located and/or how to reach the dispenser 400 (in order to perform a replenishment event, for example). In some examples, the notification 550 may comprise an indication 554 of a usage metric 554 (e.g., a rate at which dispense events are performed using the dispenser 400). Alternatively and/or additionally, the notification 550 may comprise an indication 556 of the next replenishment time. In some examples, the notification 550 may comprise a selectable input 558 for setting a reminder. In some examples, in response to a selection of the selectable input 558, the first client device 500 and/or the first application may be configured to provide a reminder (e.g., a display alert and/or an audio alert) reminding a user of the first client device 500 to perform a replenishment event of the dispenser 400 (prior to the next replenishment time, for example).

With respect to the example method 600 of FIG. 6, embodiments are contemplated in which a scan of the first tag 414 of the first refill component 410 is received in act 602 as an alternative and/or in addition to receiving the scan of the second tag 514. For example, the scan of the first tag 414 may be used to collect data (e.g., dispenser data determined by the controller 402) from the first tag 414. The data collected from the first tag 414 may be used to generate and/or update the usage profile (at act 608, for example), and/or may be used to determine the next replenishment time.

An embodiment of determining a next replenishment time of the dispenser 400 is illustrated by an example method 700 of FIG. 7, and is further described in conjunction with FIGS. 4A-5B. At 702, the controller 402 determines usage data of the dispenser 400. The usage data may be indicative of (i) a rate at which replenishment events are performed for the dispenser 400, (ii) a rate at which dispense events (e.g., an event in which the dispenser 400 dispenses a portion 454 of the product) are performed using the dispenser 400, (iii) a dispense event count of the dispenser 400 (e.g., the controller 402 may track dispense events performed using the dispenser 400), (iv) times at which replenishment events were performed for the dispenser 400, (v) times at which dispense events were performed using the dispenser 400, (vi) a peak usage rate of the dispenser 400 (e.g., a peak rate at which replenishment events and/or dispense events are performed with the dispenser 400), (vii) an average usage rate of the dispenser 400 (e.g., an average rate at which replenishment events and/or dispensers are performed with the dispenser 400), and/or (viii) other data associated with the dispenser 400.

At 704, in association with the first replenishment event (in which the first refill component 410 mounted to the dispenser 400 is replaced by the second refill component 510), the controller 402 (i) may determine a next replenishment time of the dispenser 400 based upon the usage data, and/or (ii) transmit an indication of the next replenishment time to the second tag 514 of the second refill component 510. In an example, the next replenishment time may correspond to a remaining amount of time until the second refill component 410 mounted to the dispenser 400 will be depleted of product (e.g., cleaning product) or be nearing depletion of product (and/or an amount of product in the second refill component 410 is less than a threshold amount of product). Alternatively and/or additionally, the next replenishment time may correspond to a remaining amount of time until the second refill component 410 mounted to the dispenser 400 is recommended to be switched with another refill component. In an example, the next replenishment time is determined by (i) determining an amount of product in the second refill component 410 mounted to the dispenser 400, (ii) determining (e.g., predicting), based upon the usage data, a product consumption rate at which product from the second refill component 410 is (predicted to be) dispensed by the dispenser 400, and/or (iii) determining the next replenishment time based upon the amount of product and the product consumption rate. In some examples, the controller 402 may receive an indication of the amount of product from the second refill component 510. For example, the controller 402 may receive the indication of the amount of product from the second refill component 510 during the first replenishment event. Alternatively and/or additionally, the controller 402 may receive the indication of the amount of product from the second refill component 510 via a communication session of the controller 402 with the second tag 514 (while the second tag 514 is within a threshold distance of the controller 402, for example). The communication session may comprise (i) the controller 402 receiving the indication of the amount of product, (ii) the controller 402 determining the next replenishment time based upon the amount of product and/or the usage data, and/or (iii) the controller 402 transmitting the indication of the next replenishment time to the second tag 514.

In some examples, after the controller 402 provides the indication of the next replenishment time to the second tag 514, the second tag 514 transmits (e.g., forwards) an indication of the next replenishment time to the first client device 500 (when the first client device 500 scans the second tag 514 during the first replenishment event, for example). The notification 550 may be displayed on the first client device 500 (and/or a different client device) based upon the indication of the next replenishment time.

With respect to the example method 700 of FIG. 7, embodiments are contemplated in which the controller 402 transmits the indication of the next replenishment to the first tag 414 of the first refill component 410 in act 704 as an alternative and/or in addition to transmitting the indication of the next replenishment to the second tag 514. In some examples, after the controller 402 provides the indication of the next replenishment time to the first tag 414, the first tag 414 transmits (e.g., forwards) an indication of the next replenishment time to the first client device 500 (when the first client device 500 scans the first tag 414 during the first replenishment event, for example). The notification 550 may be displayed on the first client device 500 (and/or a different client device) based upon the indication of the next replenishment time.

Figure 8A:
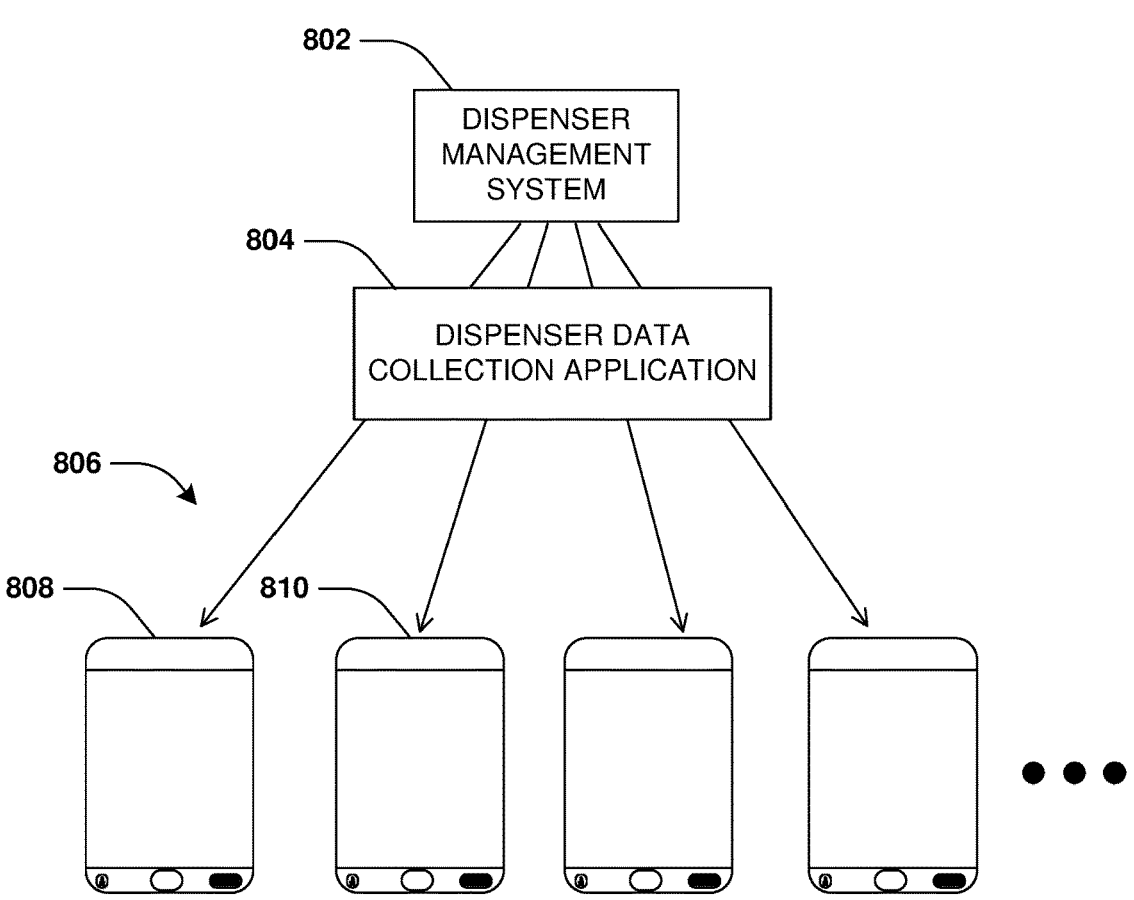
FIG. 8A is a component block diagram illustrating a dispenser management system providing a dispenser data collection application to a set of client devices, in accordance with some embodiments.
Figure 8B:
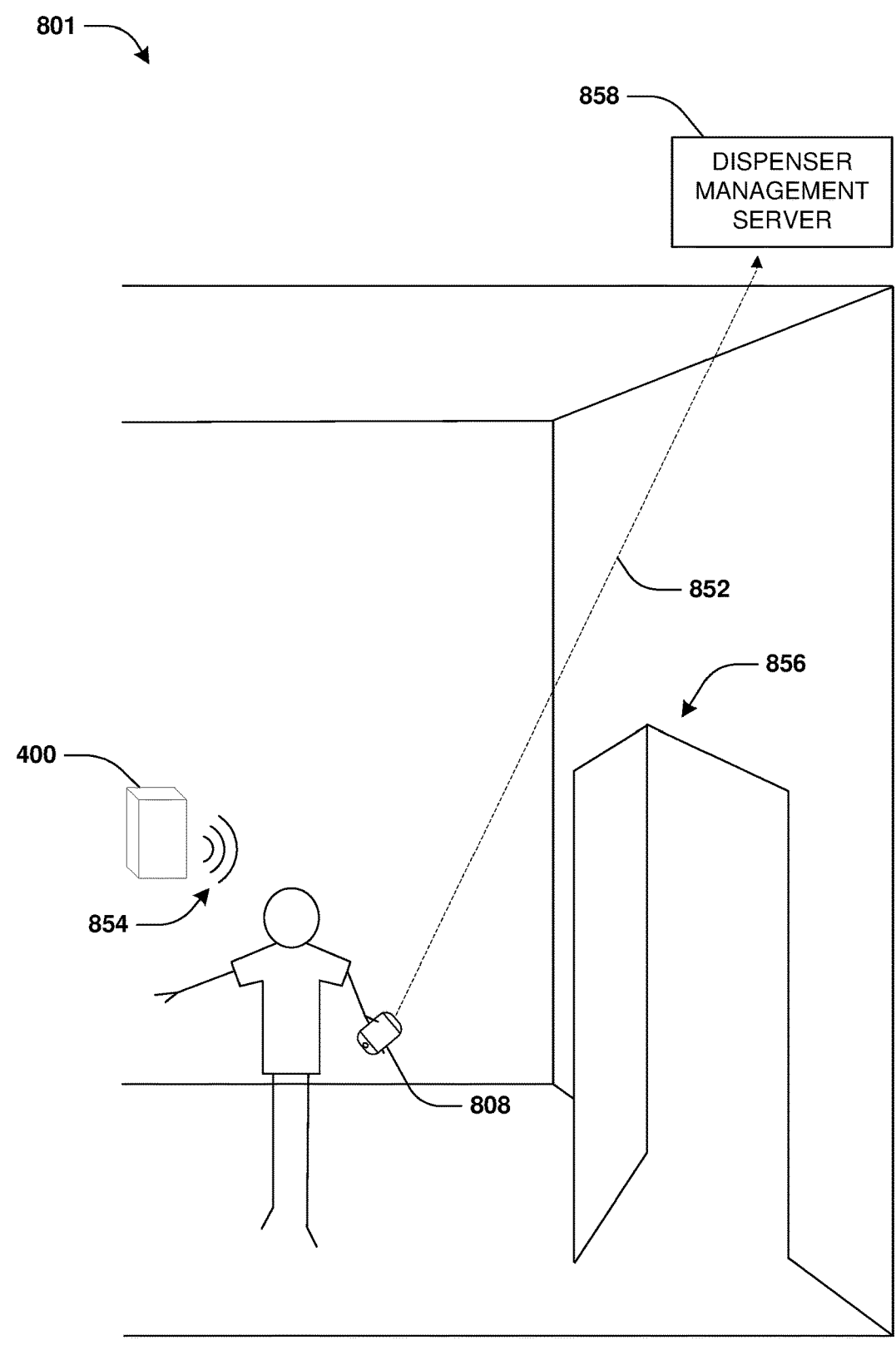
FIG. 8B is a component block diagram illustrating a client device collecting dispenser data from a dispenser, in accordance with some embodiments.
Figure 8C:
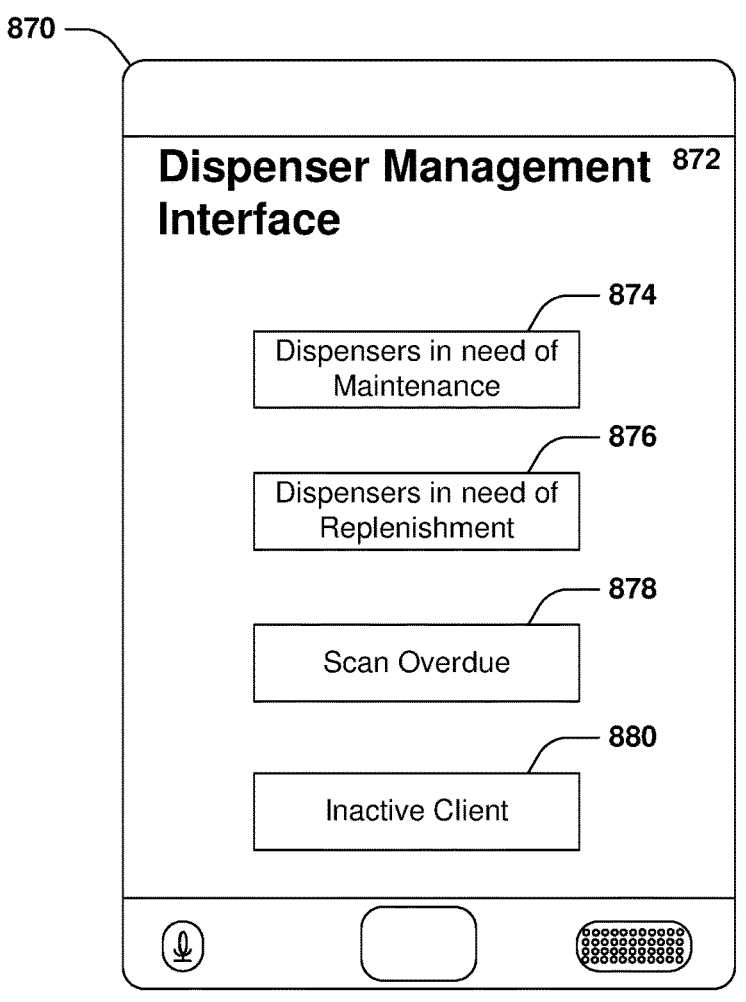
FIG. 8C illustrates a client device displaying a dispenser management interface, in accordance with some embodiments.

FIGS. 8A-8C illustrate a system 801 for dispenser management according to some embodiments. FIG. 8A illustrates the dispenser management system 802 providing a dispenser data collection application 804 (e.g., a mobile application, a web application, etc.) to a set of (one or more) client devices 806. The set of client devices 806 may comprise a third client device 808 (e.g., a phone, a smartphone, a tablet, a wearable device, a laptop, a computer, etc.) and/or one or more other client devices. The dispenser data collection application 804 may be installed on the third client device 808. The dispenser data collection application 804 may be used to communicate with the dispenser management system 802 (e.g., the third client device 808 may transmit data to and/or receive data from the dispenser management system 802 using the dispenser data collection application 804).

The dispenser data collection application 804 may configure the third client device 808 to collect dispenser data from a dispenser, such as the dispenser 400 and/or other dispensers, when the third client device 808 is within a first threshold distance of the dispenser. For example, while the dispenser data collection application 804 is running on the third client device 808, the third client device 808 may monitor for transmissions by dispensers. In some examples, dispensers (e.g., the dispenser 400) may be configured with beaconing functionality to periodically (and/or aperiodically) transmit (e.g., advertise) data packets. In some examples, the dispenser 400 may be provisioned with the beaconing functionality automatically (and/or without manual intervention). Alternatively and/or additionally, the dispenser 400 may not need to be provisioned with beaconing functionality.

In some examples, the third client device 808 is associated with (e.g., may belong to and/or be in the possession of) a user (e.g., a dispenser agent, a custodian, an office worker, etc.) associated with (e.g., employed at and/or visiting) the facility in which the dispenser 400 and/or one or more other dispensers are disposed. Alternatively and/or additionally, other client devices of the set of client devices 806 may be associated with other users associated with the facility. In some examples, the third client device 808 monitors for transmissions (e.g., advertisements) from dispensers (e.g., the dispenser 400) when the third client device 808 is in a monitoring state. In some examples, the monitoring state of the third client device 808 is controlled by the dispenser data collection application 804. In some examples, the third client device 808 enters the monitoring state (and/or remains in the monitoring state) based upon a determination that the third client device 808 is within the facility (which may be determined based upon a location of the third client device 808). In some examples, when the third client device 808 is in the monitoring state (and/or is monitoring for transmissions from dispensers) and the third client device 808 is within the first threshold distance of the dispenser 400, the third client device 808 may automatically receive a transmission of a data packet (e.g., a data packet advertisement) from the dispenser 400 without the third client device 808 and the dispenser 400 being manually linked to each other. For example, the user of the third client device 808 may pass through an area within the first threshold distance of the dispenser 400 while the third client device 808 is in the monitoring state, and the third client device 808 may automatically (and/or without manual intervention) collect a transmission of a data packet by the dispenser 400 while passing through the area. Thus, in accordance with some embodiments, the third client device 808 may automatically (and/or without manual intervention) collect data packets (e.g., advertisements) transmitted by dispensers in the facility (and/or other facilities) as (the user of) the third client device 808 moves through areas proximate the dispensers (while the third client device 808 is in the monitoring state, for example). In some examples, the dispenser data collection application 804 may control the third client device 808 to be in the monitoring state (to monitor for transmissions of data packets from dispensers, for example) while the dispenser data collection application 804 is running. In some examples, other applications (e.g., mobile applications) of the third client device 808 may run on the third client device 808 and/or may be accessed and/or interacted with while the dispenser data collection application 804 is running (and/or while the third client device 808 is in the monitoring state). For example, the dispenser data collection application 804 may be run as a background task of the third client device 808 (even while the dispenser data collection application 804 is not displayed on the third client device 808) such that the user does not need to ensure that the dispenser data collection application 804 is open to be able to collect data packets from dispensers within the first threshold distance of the third client device 808. For example, the third client device 808 may collect a data packet from a dispenser within the first threshold distance of the third client device 808 even when the dispenser data collection application 804 is closed and/or the user is not aware of the dispenser.

FIG. 8B illustrates the third client device 808 collecting a first data packet from the dispenser 400. In some examples, the third client device 808 may receive the first data packet from the dispenser 400 while the user of the third client device 808 is in a room 856 in which the dispenser 400 is disposed. For example, the dispenser 400 may use the beaconing functionality to automatically perform transmissions (e.g., periodically and/or aperiodically) of the first data packet. In some examples, the third client device 808 may be in the monitoring state when the third client device 808 receives the first data packet. In some examples, the third client device 808 may receive a transmission 854 of the first data packet. The dispenser 400 may transmit the first data packet using a first communication device of the dispenser 400. The first communication device may comprise a communication device coupled to the dispenser 400, a communication device coupled to a refill component mounted to the dispenser, the controller 402, and/or other device. The transmission 854 may be transmitted via Bluetooth Low Energy (BLE). For example, the transmission 854 may comprise a BLE advertisement output using the communication device (e.g., a BLE-capable device) of the dispenser 400 (while the communication device is in advertising state, for example). For example, the communication device may be configured to perform BLE advertisements (e.g., periodically and/or aperiodically) of the first data packet. Other examples of the transmission 854 are within the scope of the present disclosure. For example, the transmission 854 may comprise a paired BLE transmission (transmitted while the BLE device and the third client device 808 are paired with each other, for example). Other examples of the transmission 854 include a Bluetooth transmission or other type of wireless transmission. In some examples, the dispenser 400 is not made aware that the third client device 808 received the first data packet (e.g., the communication device may transmit one-way advertisements when the communication device is in the advertising state). In some examples, the first threshold distance may be dependent upon a communication protocol, a type of device, etc. of the communication device and/or the third client device 808.

In some examples, the first data packet may be indicative of third dispenser data associated with the dispenser 400. At least some of the third dispenser data may be determined by the controller 402 of the dispenser 400. The third dispenser data may be indicative of (i) a dispenser identifier of the dispenser 400 and/or (ii) usage data of the dispenser 400. The usage data may be indicative of (i) a rate at which replenishment events are performed for the dispenser 400, (ii) a rate at which dispense events (e.g., an event in which the dispenser 400 dispenses a portion 454 of the product) are performed using the dispenser 400, (iii) a dispense event count of the dispenser 400 (e.g., the controller 402 may track dispense events performed using the dispenser 400), (iv) times at which replenishment events were performed for the dispenser 400, (v) times at which dispense events were performed using the dispenser 400, (vi) a peak usage rate of the dispenser 400 (e.g., a peak rate at which replenishment events and/or dispense events are performed with the dispenser 400), (vii) an average usage rate of the dispenser 400 (e.g., an average rate at which replenishment events and/or dispensers are performed with the dispenser 400), and/or (viii) other data associated with the dispenser 400.

Alternatively and/or additionally, the third dispenser data may be indicative of a first status of the dispenser 400. For example, the first status may be indicative of (i) whether the dispenser 400 is functioning correctly, (ii) whether refill component mounted to the dispenser 400 is clogged, (iii)

whether the refill component is damaged, (iv) whether the refill component is incorrectly installed or the wrong type of refill component for the dispenser 400, (v) whether the battery of the dispenser 400 is dead or has less than a threshold amount of remaining battery life, and/or (vi) an amount of product in the refill component.

In some examples, the third client device 808 may transmit a first message 852 to a server 858 of the dispenser management system 802. The third client device 808 may include information of the first data packet, such as the third dispenser data and/or other data included in the first data packet. Alternatively and/or additionally, the third client device 808 may determine a geolocation of the third client device 808, and/or may include the geolocation in the first message 852. For example, the geolocation of the third client device 808 may be indicative of a location (e.g., GPS coordinates) of the third client device 808 when the first data packet is received by the third client device 808 and/or the first message 852 is transmitted to the server 858. In some examples, the geolocation of the third client device 808 may be used to determine dispenser identification information associated with the dispenser 400. For example, the dispenser identification information may be indicative of a facility location of the dispenser 400 and/or the dispenser identifier of the dispenser 400. In an example, the geolocation of the third client device 808 may be compared (by the dispenser management system 802, for example) with known locations of dispensers to determine that the geolocation of the client device 808 matches and/or is within a threshold distance of a known location of the dispenser 400 (which may be retrieved from a dispenser profile, of the dispenser 400, stored by the dispenser management system 802, for example). The dispenser management system 802 may associate the third dispenser data with the dispenser 400 and/or the dispenser identifier (and/or the facility location) based upon the geolocation of the third client device 808 matching and/or being within a threshold distance of the known location of the dispenser 400.

An embodiment of determining a next replenishment time of the dispenser 400 and/or providing a dispenser management interface is illustrated by an example method 900 of FIG. 9, and is further described in conjunction with FIGS. 4A-4C and FIGS. 8A-8C. At 902, the dispenser management system 802 may provide a second application (e.g., the dispenser data collection application 804) to the third client device 808. The second application may configure the third client device 808 to collect the third dispenser data from the dispenser 400 (when the third client device 808 is within the first threshold distance of the dispenser 400, for example), such as shown in FIG. 8B. At 904, the dispenser management system 802 may receive the first message 852 comprising the third dispenser data. At 906, the dispenser management system 802 may determine a first next replenishment time of the dispenser 400 based upon the third dispenser data. At 908, the dispenser management system 802 may display a dispenser management interface on a fifth client device (and/or the third client device 808). The dispenser management interface may display an indication of the first next replenishment time of the dispenser 400. Alternatively and/or additionally, the dispenser management interface may display an indication of the dispenser identification information (e.g., the facility location of the dispenser 400 and/or the dispenser identifier of the dispenser 400) in association with the first next replenishment time of the dispenser 400. For example, the indication of the dispenser identification information may be displayed adjacent to the indication of the first next replenishment time of the dispenser (to allow a user of the fifth client device to identify and/or access the dispenser 400).

Alternatively and/or additionally, the dispenser management system 802 may receive messages from other client devices (other than the third client device 808) of the set of client devices 806. The messages from the other client devices may comprise dispenser data collected by the other client devices from dispensers in the facility (using one or more of the techniques provided herein with respect to collecting the third dispenser data from the dispenser 400). For example, the dispenser management system 802 may provide a third application (e.g., the dispenser data collection application 804) to a fourth client device 810 (shown in FIG. 8A). The second application may configure the fourth client device 810 to collect (e.g., automatically and/or without manual intervention) fourth dispenser data from a second dispenser (when the fourth client device 810 is within a second threshold distance of the dispenser 400, for example). The second threshold distance may be the same as or different than the first threshold distance. The dispenser management system 802 may receive a second message comprising the fourth dispenser data (such as using one or more of the techniques provided herein with respect to receiving the first message 852). The dispenser management system 802 may determine a second next replenishment time of the second dispenser based upon the fourth dispenser data. The dispenser management interface may display an indication of the second next replenishment time of the second dispenser.

In some examples, the dispenser management system 802 may generate and/or maintain a facility profile indicative of next replenishment times and/or statuses of a plurality of dispensers associated with the facility. In some examples, the plurality of dispensers may comprise the dispenser 400, the second dispenser and/or other dispensers. The facility profile may be updated in response to receiving a message (comprising dispenser data collected from a dispenser of the plurality of dispensers, for example) from a client device of the set of client devices 806. For example, the facility profile may be updated in response to receiving the first message 852. For example, the facility profile may be updated such that the facility profile indicates that a next replenishment time of the dispenser 400 is the first next replenishment time (indicated by the first message 852, for example). Alternatively and/or additionally, the facility profile may be updated such that the facility profile indicates that a next replenishment time of the dispenser 400 is the first next replenishment time (determined based upon the first message 852, for example). Alternatively and/or additionally, the facility profile may be updated such that the facility profile indicates that a status of the dispenser 400 is the first status (indicated by the first message 852, for example). Thus, in accordance with some embodiments, the facility profile may comprise accurate and/or updated (e.g., constantly updated) information associated with the plurality of dispensers.

The facility profile may be used to coordinate instructions for replenishment and/or maintenance of dispensers in the facility. For example, the instructions may specify a time and/or an order for a dispenser agent to perform replenishment events and/or other maintenance operations (e.g., battery changes, repairs, etc.) for dispensers in the facility. The instructions may be displayed by the dispenser management interface.

In some examples, the dispenser management interface may be used to access at least one of usage data, determined next replenishment times, statuses, etc. (recorded in the facility profile, for example) associated with dispensers of the plurality of dispensers. For example, the dispenser management interface may display a list of dispensers in need of maintenance, such as a list of dispensers (e.g., dispensers of the plurality of dispensers) that are determined to be faulty. For example, the list of dispensers in need of maintenance may be determined based upon statuses, of the dispensers, indicated by the facility profile. For example, the dispenser 400 may be included in the list of dispensers in need of maintenance based upon a determination that the first status indicates that (i) the dispenser 400 is not functioning correctly, (ii) a refill component mounted to the dispenser 400 is clogged, (iii) the refill component is damaged, (iv) the refill component is incorrectly installed or the wrong type of refill component for the dispenser 400, and/or (v) the battery of the dispenser 400 is dead or has less than a threshold amount of remaining battery life. In some examples, the dispenser management interface (and/or the list of dispensers in need of maintenance) may include an instruction to perform a maintenance operation (e.g., repair, unclogging a refill component, replacing a battery, etc.) on the dispenser 400.

Alternatively and/or additionally, the dispenser management interface may display a list of dispensers in need of replenishment, such as a list of dispensers (e.g., dispensers of the plurality of dispensers) that are associated with next replenishment times that are (i) within a first period of time (e.g., today, tomorrow, etc.) or (ii) past due. The first period of time may span from a current time to a time in the future (e.g., one or more days into the future). Thus the list of dispensers in need of replenishment may identify which dispensers in the facility should be replenished soon. For example, the list of dispensers in need of replenishment may be determined based upon next replenishment times, of the dispensers, indicated by the facility profile. For example, the dispenser 400 may be included in the list of dispensers in need of replenishment based upon a determination that the first next replenishment time is within the first period of time. In some examples, the dispenser management interface (and/or the list of dispensers in need of replenishment) may include an instruction to perform a replenishment operation (e.g., a replenishment event, etc.) on the dispenser 400.

Alternatively and/or additionally, the dispenser management interface may display a list of scan overdue dispensers, such as a list of dispensers (e.g., dispensers of the plurality of dispensers) for which dispenser data has not been collected for a threshold amount of time (e.g., the past week). For example, information indicated by the facility profile for a dispenser in the list of scan overdue dispensers may be outdated.

Alternatively and/or additionally, the dispenser management interface may display a list of inactive clients, such as a list of client devices, of the set of client devices 806, that have not collected and/or provided dispenser data (to the dispenser management system 802, for example) for a threshold amount of time. In some examples, a client device of the list of inactive clients may be reconfigured (and/or the dispenser data collection application 804 may be reinstalled on the client device) to activate the client device for use in collecting and/or providing dispenser data.

For each dispenser of the plurality of dispensers, the dispenser management interface may provide a facility location and/or a dispenser identifier to enable a user (e.g., a dispenser technician) to identify and/or access the dispenser (to repair the dispenser, replenish the dispenser, etc.).

FIG. 8C illustrates the fifth client device (shown with reference number 870) displaying the dispenser management interface (shown with reference number 872). The dispenser management interface 872 may comprise a selectable input 874 for accessing the list of dispensers in need of maintenance, a selectable input 876 for accessing the list of dispensers in need of replenishment, a selectable input 878 for accessing the list of scan overdue dispensers and/or a selectable input 880 for accessing the list of inactive clients.

Figure 11:
FIG. 11 is a component block diagram illustrating a dispenser management system receiving an image of a refill component from a client device, in accordance with some embodiments.

An embodiment of determining a next replenishment time of the dispenser 400 is illustrated by an example method 1000 of FIG. 10, and is further described in conjunction with FIGS. 4A-4C. At 1002, at a first time, the dispenser management system 802 (and/or a client device) may receive a first image of a third refill component (e.g., the first refill component 410 and/or the second refill component 510) mounted to the dispenser 400. In some examples, the first image comprises a depiction of at least some of the third refill component. The first image may comprise a depiction of at least some of the dispenser 400. Embodiments are contemplated in which the first image does not show the dispenser 400 (but shows at least some of the third refill component that is mounted to the dispenser 400. The first image may be received from a sixth client device. In some examples, the sixth client device may be associated with (e.g., may belong to and/or be in the possession of) a dispenser agent (e.g., a technician, a custodian, etc.). The dispenser agent may be tasked with capturing images (e.g., the first image) of one or more dispensers (e.g., the dispenser 400). For example, the first image may be captured using a camera of the sixth client device. Alternatively and/or additionally, the first image may be captured within an environment provided by the first application. In some examples, the first application may display a guidance interface with graphical objects and/or text that guide the dispenser agent to position the sixth client device relative to the third refill component and/or to engage with an interface feature (e.g., a button, a selectable input, etc.) that triggers the sixth client device (and/or the first application) to capture the first image of the third refill device. FIG. 11 illustrates a server 1106 of the dispenser management system 802 receiving the first image (shown with reference number 1104) in a system 1101, according to some embodiments. The first image 1104 may be received from the sixth client device (shown with reference number 1102).

At 1004, the dispenser management system 802 (and/or the sixth client device 1102) may determine, based upon the first image 1104, a first amount of product in the third refill component. In some examples, the dispenser management system 802 may determine the first amount of product in the third refill component using a computer vision model (e.g., an artificial intelligence (AI) vision model). The computer vision model may comprise a second machine learning model. In some examples, the second machine learning model may comprise at least one of a tree-based model, a machine learning model used to perform linear regression, a machine learning model used to perform logistic regression, a decision tree model, a SVM, a Bayesian network model, a kNN model, a K-Means model, a random forest model, a machine learning model used to perform dimensional reduction, a machine learning model used to perform gradient boosting, a neural network model (e.g., a deep neural network model and/or a convolutional neural network model), etc.

The second machine learning model may be trained to determine the first amount of product in the third refill component based upon the first image 1104. For example, the second machine learning model may be trained using a set of images of refill components with varying amounts of product. For example, the set of images used to train the second machine learning model may comprise one or more images of a refill component that is 10% filled, one or more images of a refill component that is 20% filled, one or more images of a refill component that is 30% filled, etc. The set of images may be labeled (with labels identifying corresponding amounts of product, for example).

Alternatively and/or additionally, the second machine learning model may be trained to determine a refill component type of the third refill component based upon the first image 1104. For example, the second machine learning model may be trained using a set of images of various types of refill components. For example, the set of images used to train the second machine learning model may comprise one or more images of a first type of refill component, one or more images of a second type of refill component, etc. The set of images may be labeled (with labels identifying corresponding refill component types, for example).

Alternatively and/or additionally, the second machine learning model may be trained to determine a dispenser type of the dispenser 400 based upon the first image 1104. For example, the second machine learning model may be trained using a set of images of various types of dispensers. For example, the set of images used to train the second machine learning model may comprise one or more images of a first type of dispenser, one or more images of a second type of dispenser, etc. The set of images may be labeled (with labels identifying corresponding dispenser types, for example).

In some examples, the second machine learning model may be trained using images of refill components and/or dispensers with various brands, colors, graphics, etc. Alternatively and/or additionally, the second machine learning model may be trained (e.g., continually trained) as more images (e.g., the first image 1104 and/or other images) of refill components and/or dispensers are received by the dispenser management system 802, thereby providing for increased accuracy of the second machine learning model over time.

In some examples, the second machine learning model may be trained to identify the dispenser 400 based upon the first image 1104. The second machine learning model may be trained to recognize features (e.g., unique features) of the dispenser 400, such as at least one of dispenser color, product type (soap/sanitizer) custom graphics, custom branding labels, wall/background behind the dispenser 400, a serial number, etc. For example, the second machine learning model may identify the dispenser 400 (and/or may associate the first amount of product with the dispenser identifier of the dispenser 400) based upon recognizing the features of the dispenser 400 in the first image 1104. The second machine learning model may recognize a visual expiry (e.g., a visual indication of a date of expiration of the third refill component) on the third refill component and/or the code 404 on the dispenser 400 (and/or a code on the third refill component).

In an example, the first image 1104 may comprise a depiction 1104 of the code 404. The dispenser management system 802 (and/or the second machine learning model) may analyze the first image 1104 to determine the code 404, which may be indicative of the dispenser identifier of the dispenser 400. The dispenser management system 802 may associate the first amount of product with the dispenser identifier of the dispenser 400 based upon the code 404. Alternatively and/or additionally, the dispenser 400 associated with the first image 1104 may be manually identified by a user of the sixth client device 1102 (using the first application, for example).

At 1006, at a second time, the dispenser management system 802 may receive a second image of a fourth refill component mounted to the dispenser 400. The fourth refill component may be a different refill component than the third refill component. Embodiments are contemplated in which the fourth refill component is the same refill component as the third refill component. The second image may be received from the sixth client device 1102 or a seventh client device different than the sixth client device 1102. The second image may be captured and/or received using one or more of the techniques provided herein with respect to the first image 1104. At 1008, a second amount of product in the fourth refill component may be determined (by the dispenser management system 802 and/or the sixth client device 1102) based upon the second image, such as using one or more of the techniques provided herein with respect to determining the first amount of product based upon the first image 1104.

At 1012, a second usage profile associated with the dispenser 400 may be generated (by the dispenser management system 802 and/or the sixth client device 1102) based upon (i) the first amount of product (and/or the first time), (ii) the second amount of product (and/or the second time) and/or (iii) one or more other amounts of products (and/or times) associated with the dispenser 400. In some examples, in response to determining the first amount of product (and/or associating the first amount of product with the dispenser identifier of the dispenser 400), the dispenser management system 802 may store an indication of the first amount of product and/or the first time in the second usage profile. Alternatively and/or additionally, in response to determining the second amount of product (and/or associating the second amount of product with the dispenser identifier of the dispenser 400), the dispenser management system 802 may store an indication of the second amount of product and/or the second time in the second usage profile. Alternatively and/or additionally, the second usage profile may be indicative of (i) a rate at which replenishment events are performed for the dispenser 400, (ii) a rate at which dispense events are performed using the dispenser 400, (iii) a dispense event count of the dispenser 400, (iv) times at which replenishment events were performed for the dispenser 400, (v) times at which dispense events were performed using the dispenser 400, (vi) a peak usage rate of the dispenser 400 (e.g., a peak rate at which replenishment events and/or dispense events are performed with the dispenser 400), (vii) an average usage rate of the dispenser 400 (e.g., an average rate at which replenishment events and/or dispensers are performed with the dispenser 400), and/or (viii) other data associated with the dispenser 400. Alternatively and/or additionally, the second usage profile may be indicative of one or more usage patterns of the dispenser 400.

At 1012, the next replenishment time of the dispenser 400 may be determined (by the first client device 500 and/or the dispenser management system, for example) based upon the second usage profile. In an example, the next replenishment time may correspond to a remaining amount of time until a current refill component mounted to the dispenser 400 will be depleted of product (e.g., cleaning product) or be nearing depletion of product (and/or an amount of product in the current refill component is less than a threshold amount of product). Alternatively and/or additionally, the next replenishment time may correspond to a remaining amount of time until the current refill component mounted to the dispenser 400 is recommended to be switched with another refill component. In an example, the next replenishment time is determined by (i) determining an amount of product in the current refill component mounted to the dispenser 400 (e.g., the amount of product may be determined a most recently received image associated with the dispenser 400, such as the second image of the dispenser 400), (ii) determining (e.g., predicting) a product consumption rate at which product from the current refill component is dispensed by the dispenser 400 based upon the second usage profile (and/or based upon the first amount of product, the first time, the second amount of product, the second time and/or one or more other amounts of product associated with the dispenser 400), and/or (iii) determining the next replenishment time based upon the amount of product and the product consumption rate. Alternatively and/or additionally, the next replenishment time may be determined based upon the one or more usage patterns (e.g., days predicted to have relatively greater or lesser dispenser usage may be considered in determining the product consumption rate).

In some examples, the first usage profile (discussed herein with respect to FIGS. 5A-6) may be generated (and/or updated) based upon (i) the first amount of product (and/or the first time), (ii) the second amount of product (and/or the second time) and/or (iii) one or more other amounts of products (and/or times) associated with the dispenser 400. For example, in addition to using data collected from tags (e.g., the first tag 414 and/or the second tag 514) of refill components (e.g., the first refill component 410 and/or the second refill component 510) to determine the first usage profile, the dispenser management system 802 may supplement the data with image-derived data (e.g., the first amount of product, the first time, the second amount of product, the second time, etc.) to provide for more accurate determinations of next replenishment times. For example, the first image 1104 may be captured between replenishment events of the dispenser 400, such as between the first replenishment event and a subsequent replenishment event.

In some examples, at least some of the disclosed subject matter may be implemented on a client device, and in some examples, at least some of the disclosed subject matter may be implemented on a server (e.g., hosting a service accessible via a network, such as the Internet).

In accordance with some embodiments of the present disclosure, in response to determining the first amount of product based upon the first image 1104, the dispenser management system 802 (and/or the sixth client device 1102) may (i) determine, based upon the second usage profile, a product consumption rate at which product from the current refill component is dispensed by the dispenser 400, (ii) determine the next replenishment time based upon the first amount of product and the product consumption rate (and/or based upon the second usage profile), (iii) display (via an interface of the first application, for example) an indication of the next replenishment time on the sixth client device 1102, (iv) store an indication of the next replenishment time in memory, and/or (v) provide one or more reminders of the next replenishment time to the sixth client device 1102.

According to some embodiments, a method is provided. The method includes determining, by a controller of a dispenser, usage data of the dispenser; and in association with a replenishment event in which a second refill component mounted to the dispenser is replaced by a first refill component: (i) determining, by the controller, a next replenishment time of the dispenser based upon the usage data; and (ii) transmitting, by the controller, an indication of the next replenishment time to a first tag of the first refill component.

According to some embodiments, the usage data comprises at least one of: a rate at which replenishment events are performed for the dispenser; a rate at which dispense events are performed using the dispenser; a dispense count of the dispenser; times at which replenishment events were performed for the dispenser; times at which dispense events were performed using the dispenser; a peak usage rate of the dispenser; or an average usage rate of the dispenser.

According to some embodiments, the first tag of the first refill component transmits an indication of the next replenishment time of the dispenser to a first client device associated with the replenishment event.

According to some embodiments, the transmitting, by the controller, the indication of the next replenishment time to the first tag is performed via Near Field Communication (NFC).

According to some embodiments, the method includes receiving, by the controller and from the first tag of the first refill component, an indication of an amount of product in the first refill component, wherein the determining the next replenishment time of the dispenser is based upon the amount of product.

According to some embodiments, a method is provided. The method includes receiving a scan of a first tag of a first refill component, wherein the scan of the first tag of the first refill component is performed in association with a replenishment event in which a second refill component mounted to a dispenser is replaced by the first refill component, wherein at least one of: the first refill component is a new refill component; or the second refill component is a used refill component; receiving a scan of a code associated with the dispenser; associating the replenishment event with the dispenser based upon the scan of the first tag and the scan of the code; generating a usage profile associated with the dispenser based upon at least one of: one or more replenishment events, comprising the replenishment event, associated with the dispenser; or data received from one or more refill components comprising the second refill component; and determining a next replenishment time of the dispenser based upon the usage profile.

According to some embodiments, the method includes displaying a notification of the next replenishment time on a first client device, wherein the notification is indicative of at least one of a dispenser identifier of the dispenser or a facility location of the dispenser associated with the dispenser.

According to some embodiments, the code associated with the dispenser comprises a Quick Response (QR) code.

According to some embodiments, the method includes receiving, at a first time, a first image of the second refill component; determining a first amount of product in the second refill component based upon the first image; receiving, at a second time, a second image of the first refill component or the second refill component mounted to the dispenser; determining a second amount of product in the first refill component or the second refill component based upon the second image; and updating the usage profile based upon the first amount of product and the second amount of product.

According to some embodiments, the first tag of the first refill component comprises a Near Field Communication (NFC) tag; the scan of the first tag is performed by at least one of: reading from the first tag using an NFC tag reading device of a first client device; tapping the first client device onto the first tag; or positioning the first client device within a threshold distance of the first tag.

According to some embodiments, a method is provided. The method includes providing a first application to a first client device, wherein: the first application configures the first client device to collect first dispenser data from a first dispenser when the first client device is within a first threshold distance of the first dispenser; and the first dispenser data is indicative of at least one of a first status of the first dispenser or first usage data of the first dispenser; receiving a first message comprising the first dispenser data from the first client device; determining, based upon the first dispenser data, a next replenishment time of the first dispenser; and displaying a dispenser management interface on a second client device, wherein the dispenser management interface displays an indication of the next replenishment time of the first dispenser.

According to some embodiments, the method includes providing a second application to a third client device, wherein the second application configures the third client device to collect second dispenser data from a second dispenser when the third client device is within a second threshold distance of the second dispenser; receiving the second dispenser data from the third client device, wherein the second dispenser data is indicative of at least one of a second status of the second dispenser or second usage data of the second dispenser; and determining, based upon the second dispenser data, a second next replenishment time of the second dispenser, wherein the dispenser management interface displays an indication of the second next replenishment time of the second dispenser.

According to some embodiments, the method includes determining dispenser identification information associated with the first dispenser, wherein the dispenser identification information is indicative of at least one of a dispenser identifier of the first dispenser or a facility location of the first dispenser, wherein the dispenser management interface displays an indication of the dispenser identification information in association with the indication of the next replenishment time of the first dispenser.

According to some embodiments, the first message is indicative of a geolocation of the first client device; and the determining the dispenser identification information comprises determining the dispenser identification information based upon the geolocation of the first client device.

According to some embodiments, the dispenser management interface displays at least one of: a list of dispensers in need of maintenance; or a list of dispensers in need of replenishment.

According to some embodiments, the method includes the first dispenser provides the first dispenser data to the first client device via a Bluetooth Low Energy (BLE) advertisement.

According to some embodiments, a method is provided. The method includes receiving, at a first time, a first image of a first refill component mounted to a dispenser; determining a first amount of product in the first refill component based upon the first image; receiving, at a second time, a second image of the first refill component or a second refill component mounted to the dispenser; determining a second amount of product in the first refill component or the second refill component based upon the second image; generating a usage profile associated with the dispenser based upon the first amount of product and the second amount of product; and determining a next replenishment time of the dispenser based upon the usage profile.

According to some embodiments, the method includes displaying a notification of the next replenishment time on a first client device, wherein the notification is indicative of dispenser identification information comprising at least one of a dispenser identifier of the dispenser or a facility location of the dispenser associated with the dispenser.

According to some embodiments, the first image comprises a depiction of a code on a surface of the dispenser; and the method comprises analyzing the first image to determine the code; and associating the first amount of product with the dispenser identifier of the dispenser based upon the code.

According to some embodiments, the determining the first amount of product comprises determining the first amount of product using a machine learning model trained using images of refill components with varying amounts of product.

According to some embodiments, the first image is received from a first client device; and the second image is received from a second client device different than the first client device.

According to some embodiments, a method is provided. The method includes scanning, by a first client device, a first tag of a first refill component, wherein the scanning the first tag of the first refill component is performed in association with a replenishment event in which a second refill component mounted on a dispenser is replaced by the first refill component, wherein at least one of: the first refill component is a new refill component; or the second refill component is a used refill component; scanning, by the first client device, a code associated with the dispenser; based upon the scanning the first tag and the scanning the code, associating the replenishment event with the dispenser; generating a usage profile associated with the dispenser based upon at least one of: one or more replenishment events, comprising the replenishment event, associated with the dispenser; or data received from one or more refill components mounted on the dispenser; and predicting a next refill time based upon the usage profile.

According to some embodiments, at least one of the associating the replenishment event with the dispenser, the generating the usage profile, or the predicting the next refill time is performed using the first client device.

According to some embodiments, the method includes installing an application on the first client device, wherein at least one of the scanning the first tag of the first refill component, the scanning the code associated with the dispenser, the associating the replenishment event with the dispenser, the generating the usage profile, or the predicting the next refill time is performed using at least one of the application or a server associated with the application.

According to some embodiments, the method includes displaying a notification (e.g., an alert) of the next refill time on the first client device, wherein the notification is indicative of at least one of a location, an identifier, a room, or a building section associated with the dispenser.

According to some embodiments, the method includes predicting a plurality of next refill times associated with a plurality of dispensers of a facility; determining that a set of one or more next refill times of the plurality of next refill times are within a first period of time (e.g., today, tomorrow, this week, etc.); and in response to determining that the set of one or more next refill times are within the first period of time, displaying a notification of the set of one or more next refill times, wherein for each dispenser associated with a next refill time of the set of one or more next refill times, the notification comprises an indication of at least one of a location, an identifier, a room, or a building section associated with the dispenser.

According to some embodiments, the code associated with the dispenser comprises a Quick Response (QR) code.

According to some embodiments, at least one of: the first tag of the first refill component comprises at least one of: a Near Field Communication (NFC) tag; or a Radio-Frequency Identification (RFID) tag; or the scanning the first tag by the first client device comprises at least one of: reading from the first tag (e.g., via NFC) using an NFC tag reading device of the first client device; tapping the first client device onto the first tag; or positioning the first client device within a threshold distance of the first tag.

According to some embodiments, the method includes the usage profile comprises at least one of: a rate at which replenishment events are performed for the dispenser; a rate at which dispense events are performed using the dispenser; a dispense count of the dispenser; times at which replenishment events were performed for the dispenser; times at which dispense events were performed using the dispenser; a peak usage rate of the dispenser (e.g., a peak rate at which replenishment events or dispense events are performed with the dispenser); or an average usage rate of the dispenser (e.g., an average rate at which replenishment events or dispensers are performed with the dispenser).

According to some embodiments, a method is provided. The method includes determining, by a dispenser computer of a dispenser, usage data of the dispenser, wherein the usage data comprises at least one of: a rate at which replenishment events are performed for the dispenser; a rate at which dispense events are performed using the dispenser; a dispense count of the dispenser; times at which replenishment events were performed for the dispenser; times at which dispense events were performed using the dispenser; a peak usage rate of the dispenser (e.g., a peak rate at which replenishment events or dispense events are performed with the dispenser); or an average usage rate of the dispenser (e.g., an average rate at which replenishment events or dispensers are performed with the dispenser); and in association with a replenishment event in which a second refill component mounted on a dispenser is replaced by a first refill component: predicting, by the dispenser computer, a next refill time based upon at least one of the usage data or an amount of product (e.g., soap, hand sanitizer, etc.) in the first refill component; transmitting, by the dispenser computer, an indication of the next refill time to a first tag of the first refill component; and transmitting, by the first tag of the first refill component, an indication of the next refill time of the dispenser to a first client device (e.g., a smartphone, a tablet, a wearable device, a laptop, etc.) associated with the replenishment event.

According to some embodiments, the method includes receiving, by the dispenser computer, an indication of the amount of product from the first tag of the first refill component.

According to some embodiments, in association with the replenishment event, scanning, by the first client device, the first tag of the first refill component, wherein the transmitting the indication of the next refill time by the first tag of the first refill component to the first client device is performed in response to the scanning the first tag.

According to some embodiments, the method includes scanning, by the first client device, a code associated with the dispenser, wherein at least one of the replenishment event or the next refill time are determined to be associated with the dispenser based upon the code.

According to some embodiments, the method includes displaying a notification (e.g., an alert) of the next refill time on the first client device, wherein the notification is indicative of at least one of a location, an identifier, a room, or a building section associated with the dispenser.

According to some embodiments, the method includes installing an application on the first client device, wherein at least one of the scanning the first tag of the first refill component, the scanning the code associated with the dispenser, or the displaying the notification of the next refill time is performed using at least one of the application or a server associated with the application.

According to some embodiments, the method includes receiving, by the first client device and from refill components, indications of a plurality of next refill times associated with a plurality of dispensers of a facility; determining that a set of one or more next refill times of the plurality of next refill times are within a first period of time (e.g., today, tomorrow, this week, etc.); and in response to determining that the set of one or more next refill times are within the first period of time, displaying a notification of the set of one or more next refill times, wherein for each dispenser associated with a next refill time of the set of one or more next refill times, the notification comprises an indication of at least one of a location, an identifier, a room, or a building section associated with the dispenser.

According to some embodiments, the code associated with the dispenser comprises a Quick Response (QR) code.

According to some embodiments, at least one of: the first tag of the first refill component comprises at least one of: a Near Field Communication (NFC) tag; or a Radio-Frequency Identification (RFID) tag; or the scanning the first tag by the first client device comprises at least one of: reading from the first tag (e.g., via NFC) using an NFC tag reading device of the first client device; tapping the first client device onto the first tag; or positioning the first client device within a threshold distance of the first tag.

According to some embodiments, at least one of communication between the first tag of the first refill component and the dispenser computer of the dispenser is performed via Near Field Communication (NFC); or communication between the first tag of the first refill component and the first client device is performed via NFC.

According to some embodiments, a method is provided. The method includes determining, by a dispenser computer of a dispenser, usage data of the dispenser, wherein the usage data comprises at least one of: a rate at which replenishment events are performed for the dispenser; a rate at which dispense events are performed using the dispenser; a dispense count of the dispenser; times at which replenishment events were performed for the dispenser; times at which dispense events were performed using the dispenser; a peak usage rate of the dispenser (e.g., a peak rate at which replenishment events or dispense events are performed with the dispenser); or an average usage rate of the dispenser (e.g., an average rate at which replenishment events or dispensers are performed with the dispenser); and in association with a replenishment event in which a second refill component mounted on a dispenser is replaced by a first refill component: transmitting, by the dispenser computer, an indication of the usage data to a first tag of the first refill component; predicting, by the first tag of the first refill component, a next refill time based upon at least one of the usage data or an amount of product (e.g., soap, hand sanitizer, etc.) in the first refill component; and transmitting, by the first tag of the first refill component, an indication of the next refill time of the dispenser to a first client device (e.g., a smartphone, a tablet, a wearable device, a laptop, etc.) associated with the replenishment event.

According to some embodiments, the method includes displaying a notification (e.g., an alert) of the next refill time on the first client device, wherein the notification is indicative of at least one of a location, an identifier, a room, or a building section associated with the dispenser.

According to some embodiments, the method includes at least one of communication between the first tag of the first refill component and the dispenser computer of the dispenser is performed via Near Field Communication (NFC); or communication between the first tag of the first refill component and the first client device is performed via NFC.

According to some embodiments, a method is provided. The method includes determining, by a dispenser computer of a dispenser, usage data of the dispenser, wherein the usage data comprises at least one of: a rate at which replenishment events are performed for the dispenser; a rate at which dispense events are performed using the dispenser; a dispense count of the dispenser; times at which replenishment events were performed for the dispenser; times at which dispense events were performed using the dispenser; a peak usage rate of the dispenser (e.g., a peak rate at which replenishment events or dispense events are performed with the dispenser); or an average usage rate of the dispenser (e.g., an average rate at which replenishment events or dispensers are performed with the dispenser); and in association with a replenishment event in which a second refill component mounted on a dispenser is replaced by a first refill component: transmitting, by the dispenser computer, an indication of the usage data to a first tag of the first refill component; transmitting, by the first tag of the first refill component and to a first client device (e.g., a smartphone, a tablet, a wearable device, a laptop, etc.) associated with the replenishment event, an indication of at least one of the usage data or an amount of product (e.g., soap, hand sanitizer, etc.) in the first refill component; and predicting, by at least one of the first client device or a server, a next refill time based upon at least one of the usage data or the amount of product in the first refill component.

According to some embodiments, the method includes displaying a notification (e.g., an alert) of the next refill time on the first client device, wherein the notification is indicative of at least one of a location, an identifier, a room, or a building section associated with the dispenser.

According to some embodiments, the method includes at least one of: communication between the first tag of the first refill component and the dispenser computer of the dispenser is performed via Near Field Communication (NFC); or communication between the first tag of the first refill component and the first client device is performed via NFC.

According to some embodiments, a method is provided. The method includes installing a first application (e.g., dispenser data collection application 804) on a first client device (e.g., a smartphone, a tablet, a wearable device, a laptop, etc.); transmitting, by a first dispenser computer of a first dispenser, first dispenser data to the first client device, wherein the first dispenser data comprises at least one of: a first dispenser identifier (e.g., a first Media Access Control (MAC) address) of the first dispenser; a first refill component identifier of a first refill component mounted on the first dispenser; a problem status of the first dispenser; a rate at which replenishment events are performed for the first dispenser; a rate at which dispense events are performed using the first dispenser; a dispense count (e.g., a lifetime dispense count) of the first dispenser; times at which replenishment events were performed for the first dispenser; times at which dispense events were performed using the first dispenser; a peak usage rate of the first dispenser (e.g., a peak rate at which replenishment events or dispense events are performed with the first dispenser); an average usage rate of the first dispenser (e.g., an average rate at which replenishment events or dispensers are performed with the first dispenser); a battery voltage of a first battery of the first dispenser; an amount of battery life left in the first battery of the first dispenser; a first predicted battery depletion time (e.g., when energy of the first battery is predicted to be depleted); a first predicted next refill time of the first refill component (e.g., when product in the first refill component is predicted to be depleted); an amount of product remaining in the first refill component; or a predicted amount of time remaining until the sooner of the first predicted battery depletion time or the first predicted next refill time; and transmitting, by the first client device and to a dispenser management computer (e.g., a server and/or a cloud), a first message comprising at least some of the first dispenser data; processing, by the dispenser management computer, a plurality of messages received from a plurality of client devices to generate a dispenser management interface (e.g., Web App and/or Website interface, such as interface of Data Portal application), wherein the plurality of messages (e.g., crowdsourced dispenser information that is collected by devices that have the first application installed and/or running) are associated with a plurality of dispensers comprising the first dispenser and comprise: one or more first messages, associated with the first dispenser, received from one or more first client devices comprising the first client device, wherein the one or more first messages comprise the first message; and one or more second messages, associated with a second dispenser of the plurality of dispensers, received from one or more second client devices; and controlling a display of a second client device (e.g., a smartphone, a tablet, a wearable device, a laptop, etc.) to display the dispenser management interface, wherein the dispenser management interface comprises first dispenser information of the first dispenser (e.g., the first dispenser information may be determined based upon the one or more first messages associated with the first dispenser).

According to some embodiments, the transmitting the first message to the dispenser management computer is performed over a network (e.g., the Internet).

According to some embodiments, the method includes determining, by the first client device, a geolocation (e.g., GPS position of the first client device; and including the geolocation of the first client device in the first message.

According to some embodiments, the method includes determining, by the dispenser management computer, location information associated with the first dispenser based upon the geolocation of the first client device; storing an indication that the first dispenser is associated with the location information (e.g., the first dispenser may be a newly discovered dispenser that was not previously known to the dispenser management computer, and is discovered by way of (i) the first client device automatically collecting the first dispenser data from the first dispenser computer when the first client device is within a threshold distance of the first dispenser, and/or (ii) the first client device transmitting the first message associated with the first dispenser to the dispenser management computer); and including an indication of the location information in the first dispenser information displayed by the dispenser management interface.

According to some embodiments, at least one of (i) the determining the location information associated with the first dispenser, (ii) the storing the indication that the first dispenser is associated with the location information, or (iii) the including the indication of the location information in the first dispenser information displayed by the dispenser management interface are performed based upon a determination that dispenser identification information of the first dispenser (e.g., indicative of at least one of a location, an identifier, a room, or a building section associated with the first dispenser) is not already available to the first dispenser.

According to some embodiments, the method includes displaying a provisioning interface (e.g., a page of the dispenser management interface and/or the Data Portal application) via the second client device, wherein the provisioning interface comprises at least one of fields or selectable inputs for provisioning the first dispenser; receiving, via the provisioning interface, dispenser identification information of the first dispenser (e.g., indicative of at least one of a location, an identifier, a room, or a building section associated with the first dispenser); storing the dispenser identification information of the first dispenser in a dispenser identification datastore; and including, in the first dispenser information, an indication of at least some of the dispenser identification information displayed by the dispenser management interface.

According to some embodiments, the problem status of the first dispenser is indicative of at least one of: whether the first dispenser is functioning correctly; whether the first refill component is clogged; whether the first refill component is damaged; whether the first refill component is incorrectly installed or the wrong type of refill component for the first dispenser; or whether the battery of the first dispenser is dead or has less than a threshold amount of remaining battery life.

According to some embodiments, the method includes including, in the first dispenser information, an indication of the problem status based upon a determination that at least one of: the first dispenser does not function correctly; the first refill component is clogged; the first refill component is damaged; the first refill component is incorrectly installed or the wrong type of refill component for the first dispenser; or the battery of the first dispenser is dead or has less than a threshold amount of remaining battery life.

According to some embodiments, the first dispenser information is included in an alert (e.g., a service alert that indicates servicing is currently needed for the first dispenser and/or that servicing will be needed soon for the first dispenser); and the method comprises displaying the first dispenser information via the dispenser management interface in response to a determination that at least one of: the first predicted next refill time of the first refill component is within a first period of time (e.g., today, tomorrow, this week, etc.); the first dispenser does not function correctly; the first refill component is clogged; the first refill component is damaged; the first refill component is incorrectly installed or the wrong type of refill component for the first dispenser; or the battery of the first dispenser is dead or has less than a threshold amount of remaining battery life.

According to some embodiments, the first dispenser computer of the first dispenser transmits the first dispenser data to the first client device via at least one of Bluetooth or Bluetooth Low Energy (BLE).

According to some embodiments, at least one of: the first dispenser computer of the first dispenser transmits the first dispenser data (e.g., via at least one of Bluetooth or Bluetooth Low Energy (BLE)) to the first client device when the first client device is within a threshold distance of the first dispenser; or the first client device receives (e.g., successfully collects) the first dispenser data using the first application (e.g., the first dispenser data may be received by the first client device when the first application is installed and/or running).

According to some embodiments, the first dispenser computer of the first dispenser transmits the first dispenser data via performing one or more Bluetooth Low Energy (BLE) advertisements.

According to some embodiments, installing the first application (e.g., dispenser data collection application 804) on the plurality of client devices (e.g., a smartphones, tablets, wearable devices, laptops, etc.).

According to some embodiments, for each message of one, some and/or all messages of the plurality of messages, at least one of: the message is received from a client device of the plurality of client devices; the message is generated based upon dispenser data received from a dispenser computer of a dispenser of the plurality of dispensers; the dispenser data is automatically transmitted by the dispenser computer to the client device (even if the dispenser is not already provisioned for the dispenser management computer and/or even if the client device and the dispenser computer are not already known to each other, for example); the dispenser data is transmitted by the dispenser computer to the client device via at least one of Bluetooth or Bluetooth Low Energy (BLE); the dispenser data is transmitted by the dispenser computer to the client device via the dispenser device performing a BLE advertisement; or the dispenser data is transmitted by the dispenser computer to the client device when the client device is within a threshold distance of the dispenser (e.g., the client device gathers dispenser data automatically and/or autonomously when the client device is in proximity of a dispenser, such as any dispenser, even if the dispenser is not provisioned and/or recorded).

According to some embodiments, the method includes determining information associated with the plurality of dispensers based upon the plurality of messages; and providing, to the second client device, access to the information associated with the plurality of dispensers via the dispenser management interface.

According to some embodiments, the access to the information associated with the plurality of dispensers is provided to the second client device based upon a determination that at least one of: the plurality of dispensers are associated with an entity (e.g., a facility, a company, an organization, etc.) that is associated with the plurality of dispensers (e.g., the plurality of dispensers may be distributed across rooms, restrooms, hallways, etc. of a facility managed by the entity); the second client device is associated with (e.g., logged into) an entity account of entity; or a user of the second client device is authorized to access information associated with at least one of the entity or the plurality of dispensers.

According to some embodiments, the method includes sharing information associated with the plurality of dispensers with a client device of a second entity (e.g., the information may correspond to a crowdsourced data set that can be shared between facilities).

According to some embodiments, for each dispenser of one, some and/or all dispensers of the plurality of dispensers, the information associated with the plurality of dispensers comprises at least one of: a dispenser identifier (e.g., a MAC address) of the dispenser; a refill component identifier of a refill component mounted on the dispenser; a problem status of the dispenser; a rate at which replenishment events are performed for the dispenser; a rate at which dispense events are performed using the dispenser; a dispense count (e.g., a lifetime dispense count) of the dispenser; times at which replenishment events were performed for the dispenser; times at which dispense events were performed using the dispenser; a peak usage rate of the dispenser (e.g., a peak rate at which replenishment events or dispense events are performed with the dispenser); an average usage rate of the dispenser (e.g., an average rate at which replenishment events or dispensers are performed with the dispenser); a battery voltage of a battery of the dispenser; an amount of battery life left in the battery of the dispenser; a predicted battery depletion time (e.g., when energy of the battery is predicted to be depleted); a predicted next refill time of the refill component (e.g., when product in the refill component is predicted to be depleted); an amount of product remaining in the refill component; or a predicted amount of time remaining until the sooner of the predicted battery depletion time or the predicted next refill time, wherein at least some of the information can be used by a servicing agent to identify dispensers that require servicing and/or to determine when to service a dispenser.

According to some embodiments, the first dispenser computer of the first dispenser performs one or more computations to determine at least some of the first dispenser data (e.g., the first dispenser computer may perform averaging and/or time till empty estimates such that each communication by the first dispenser computer is a snapshot of the dispenser status without any other knowledge needed and/or such that the dispenser management computer, such as the cloud, does not need to perform computations to determine the first dispenser data, thereby reducing a processing load on the dispenser management computer).

According to some embodiments, at least one of: at least some of the plurality of client devices are associated with (e.g., belong to and/or are carried by) at least one of employees, facility workers, nurses, custodians, servicing agents, or other users; or at least some of the employees, the facility workers, the nurses, the custodians, the servicing agents, and/or the other users are associated with an entity (e.g., a facility, a company, an organization, etc.) that is associated with the plurality of dispensers (e.g., the plurality of dispensers may be distributed across rooms, restrooms, hallways, etc. of a facility managed by the entity).

According to some embodiments, when the first client device receives the first dispenser data from the first dispenser computer (e.g., over at least one of Bluetooth or Bluetooth Low Energy (BLE)), the first client device does not have an available connection to the dispenser management computer (e.g., the first client device does not have an available connection to the server and/or the cloud since the first client device does not have an Internet connection and/or does not have cloud connectivity); and the method comprises transmitting, by the first client device, the first message in response to establishing a connection to the dispenser management computer (e.g., the first client device may store the first message and transmit the first message in response to gaining Internet connection and/or cloud connectivity).

According to some embodiments, the method includes transmitting, by a second dispenser computer of a second dispenser, second dispenser data to the first client device, wherein the second dispenser data comprises at least one of: a second dispenser identifier (e.g., a first Media Access Control (MAC) address) of the second dispenser; a second refill component identifier of a second refill component mounted on the second dispenser; a problem status of the second dispenser; a rate at which replenishment events are performed for the second dispenser; a rate at which dispense events are performed using the second dispenser; a dispense count (e.g., a lifetime dispense count) of the second dispenser; times at which replenishment events were performed for the second dispenser; times at which dispense events were performed using the second dispenser; a peak usage rate of the second dispenser (e.g., a peak rate at which replenishment events or dispense events are performed with the second dispenser); an average usage rate of the second dispenser (e.g., an average rate at which replenishment events or dispensers are performed with the second dispenser); a battery voltage of a second battery of the second dispenser; an amount of battery life left in the second battery of the second dispenser; a second predicted battery depletion time (e.g., when energy of the second battery is predicted to be depleted); a second predicted next refill time of the second refill component (e.g., when product in the second refill component is predicted to be depleted); an amount of product remaining in the second refill component; or a predicted amount of time remaining until the sooner of the second predicted battery depletion time or the second predicted next refill time; and transmitting, by the first client device and to the dispenser management computer (e.g., the server and/or the cloud), a second message comprising at least some of the second dispenser data, wherein the plurality of messages comprises the second message.

According to some embodiments, the second dispenser computer of the second dispenser transmits the second dispenser data to the first client device via at least one of Bluetooth or Bluetooth Low Energy (BLE).

According to some embodiments, at least one of: the second dispenser computer of the second dispenser transmits the second dispenser data (e.g., via at least one of Bluetooth or Bluetooth Low Energy (BLE)) to the first client device when the first client device is within a threshold distance of the second dispenser; or the first client device receives (e.g., successfully collects) the second dispenser data using the first application (e.g., the second dispenser data may be received by the first client device when the first application is installed and/or running).

According to some embodiments, the second dispenser computer of the first dispenser transmits the second dispenser data via performing one or more Bluetooth Low Energy (BLE) advertisements.

Figure 12:
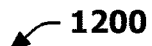
FIG. 12 is an illustration of a scenario featuring an example non-transitory machine readable medium in accordance with one or more of the provisions set forth herein.

FIG. 12 is an illustration of a scenario 1200 involving an example non-transitory machine readable medium 1202. The non-transitory machine readable medium 1202 may comprise processor-executable instructions 1212 that when executed by a processor 1216 cause performance (e.g., by the processor 1216) of at least some of the provisions herein (e.g., embodiment 1214).

The non-transitory machine readable medium 1202 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk).

The example non-transitory machine readable medium 1202 stores computer-readable data 1204 that, when subjected to reading 1206 by a reader 1210 of a device 1208 (e.g., a read head of a hard disk drive, or a read operation invoked on a solid-state storage device), express the processor-executable instructions 1212.

In some embodiments, the processor-executable instructions 1212, when executed, cause performance of operations, such as at least some of the example method 600 of FIG. 6, at least some of the example method 700 of FIG. 7, at least some of the example method 900 of FIG. 9, and/or at least some of the example method 1000 of FIG. 10, for example. In some embodiments, the processor-executable instructions 1212 are configured to cause implementation of a system, such as at least some of the example system 501 of FIGS. 5A-5B, at least some of the example system 801 of FIGS. 8A-8C, and/or at least some of the example method 1101 of FIG. 11, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
determining, by a controller of a dispenser, usage data of the dispenser; and
in association with a replenishment event in which a second refill component mounted to the dispenser is replaced by a first refill component:
determining, by the controller, a next replenishment time of the dispenser based upon the usage data; and
transmitting, by the controller, an indication of the next replenishment time to a first tag of the first refill component.

2. The method of claim 1, wherein the usage data comprises at least one of:
a rate at which replenishment events are performed for the dispenser;
a rate at which dispense events are performed using the dispenser;
a dispense count of the dispenser;
times at which replenishment events were performed for the dispenser;
times at which dispense events were performed using the dispenser;
a peak usage rate of the dispenser; or
an average usage rate of the dispenser.

3. The method of claim 1, wherein:
the first tag of the first refill component transmits an indication of the next replenishment time of the dispenser to a first client device associated with the replenishment event.

4. The method of claim 1, wherein:
the transmitting, by the controller, the indication of the next replenishment time to the first tag is performed via Near Field Communication (NFC).

5. The method of claim 1, comprising:
receiving, by the controller and from the first tag of the first refill component, an indication of an amount of product in the first refill component, wherein the determining the next replenishment time of the dispenser is based upon the amount of product.

6. A method, comprising:
receiving a scan of a first tag of a first refill component, wherein the scan of the first tag of the first refill component is performed in association with a replenishment event in which a second refill component mounted to a dispenser is replaced by the first refill component, wherein at least one of:
the first refill component is a new refill component; or
the second refill component is a used refill component;
receiving a scan of a code associated with the dispenser;
associating the replenishment event with the dispenser based upon the scan of the first tag and the scan of the code;
generating a usage profile associated with the dispenser based upon at least one of:
one or more replenishment events, comprising the replenishment event, associated with the dispenser; or
data received from one or more refill components comprising the second refill component; and
determining a next replenishment time of the dispenser based upon the usage profile.

7. The method of claim 6, comprising:
displaying a notification of the next replenishment time on a first client device, wherein the notification is indicative of at least one of a dispenser identifier of the dispenser or a facility location of the dispenser associated with the dispenser.

8. The method of claim 6, comprising:
receiving, at a first time, a first image of the second refill component;
determining a first amount of product in the second refill component based upon the first image;
receiving, at a second time, a second image of the first refill component or the second refill component mounted to the dispenser;
determining a second amount of product in the first refill component or the second refill component based upon the second image; and
updating the usage profile based upon the first amount of product and the second amount of product.

9. The method of claim 6, wherein:
the first tag of the first refill component comprises a Near Field Communication (NFC) tag; and
the scan of the first tag is performed by at least one of:
reading from the first tag using an NFC tag reading device of a first client device;
tapping the first client device onto the first tag; or
positioning the first client device within a threshold distance of the first tag.

10. A method, comprising:
providing a first application to a first client device, wherein:
the first application configures the first client device to collect first dispenser data from a first dispenser when the first client device is within a first threshold distance of the first dispenser; and
the first dispenser data is indicative of at least one of a first status of the first dispenser or first usage data of the first dispenser
receiving a first message comprising the first dispenser data from the first client device;
determining, based upon the first dispenser data, a next replenishment time of the first dispenser; and
displaying a dispenser management interface on a second client device, wherein the dispenser management interface displays an indication of the next replenishment time of the first dispenser.

11. The method of claim 10, comprising:
providing a second application to a third client device, wherein the second application configures the third client device to collect second dispenser data from a second dispenser when the third client device is within a second threshold distance of the second dispenser;

receiving the second dispenser data from the third client device, wherein the second dispenser data is indicative of at least one of a second status of the second dispenser or second usage data of the second dispenser; and determining, based upon the second dispenser data, a second next replenishment time of the second dispenser, wherein the dispenser management interface displays an indication of the second next replenishment time of the second dispenser.

12. The method of claim 10, comprising:

determining dispenser identification information associated with the first dispenser, wherein the dispenser identification information is indicative of at least one of a dispenser identifier of the first dispenser or a facility location of the first dispenser, wherein the dispenser management interface displays an indication of the dispenser identification information in association with the indication of the next replenishment time of the first dispenser.

13. The method of claim 12, wherein:

the first message is indicative of a geolocation of the first client device; and the determining the dispenser identification information comprises determining the dispenser identification information based upon the geolocation of the first client device.

14. The method of claim 12, wherein:

the dispenser management interface displays at least one of:

a list of dispensers in need of maintenance; or a list of dispensers in need of replenishment.

15. The method of claim 10, wherein:

the first dispenser provides the first dispenser data to the first client device via a Bluetooth Low Energy (BLE) advertisement.

16. A method, comprising:

receiving, at a first time, a first image of a first refill component mounted to a dispenser, wherein the first image comprises a depiction of a code on a surface of the dispenser;

determining a first amount of product in the first refill component based upon the first image;

analyzing the first image to determine the code;

associating the first amount of product with a dispenser identifier of the dispenser based upon the code;

receiving, at a second time, a second image of the first refill component or a second refill component mounted to the dispenser;

determining a second amount of product in the first refill component or the second refill component based upon the second image;

generating a usage profile associated with the dispenser based upon the first amount of product and the second amount of product; and determining a next replenishment time of the dispenser based upon the usage profile.

17. The method of claim 16, comprising:

displaying a notification of the next replenishment time on a first client device, wherein the notification is indicative of dispenser identification information comprising at least one of the dispenser identifier or a facility location associated with the dispenser.

18. The method of claim 16, wherein:

the determining the first amount of product comprises determining the first amount of product using a machine learning model trained using images of refill components with varying amounts of product.

19. A method, comprising:

receiving, at a first time and from a first client device, a first image of a first refill component mounted to a dispenser;

determining a first amount of product in the first refill component based upon the first image;

receiving, at a second time and from a second client device different than the first client device, a second image of the first refill component or a second refill component mounted to the dispenser;

determining a second amount of product in the first refill component or the second refill component based upon the second image;

generating a usage profile associated with the dispenser based upon the first amount of product and the second amount of product; and determining a next replenishment time of the dispenser based upon the usage profile.

20. The method of claim 19, wherein at least one of:

the determining the first amount of product comprises determining the first amount of product using a machine learning model trained using images of refill components with varying amounts of product; or the determining the second amount of product comprises determining the second amount of product using the machine learning model trained using images of refill components with varying amounts of product.

* * * * *